(12) United States Patent
Bullock et al.

(10) Patent No.: US 8,980,632 B2
(45) Date of Patent: Mar. 17, 2015

(54) METHOD AND APPARTUS FOR EXTRACTION OF PLANT EMBRYOS

(75) Inventors: William Paul Bullock, Ames, IA (US); Josh Severson, Ames, IA (US)

(73) Assignee: Syngenta Participations AG, Basel (CH)

( * ) Notice: Subject to any disclaimer, the term of this patent is extended or adjusted under 35 U.S.C. 154(b) by 537 days.

(21) Appl. No.: 12/990,883

(22) PCT Filed: May 22, 2009

(86) PCT No.: PCT/US2009/003162
§ 371 (c)(1),
(2), (4) Date: Nov. 3, 2010

(87) PCT Pub. No.: WO2009/142752
PCT Pub. Date: Nov. 26, 2009

(65) Prior Publication Data
US 2011/0078819 A1   Mar. 31, 2011

Related U.S. Application Data

(60) Provisional application No. 61/128,695, filed on May 23, 2008.

(51) Int. Cl.
| C12N 5/00 | (2006.01) |
| C12N 15/82 | (2006.01) |
| A01C 1/00 | (2006.01) |

(52) U.S. Cl.
CPC ........................................ *A01C 1/00* (2013.01)
USPC ........................... 435/420; 435/427; 800/278

(58) Field of Classification Search
USPC .................................. 435/420, 427; 800/278
See application file for complete search history.

(56) References Cited

U.S. PATENT DOCUMENTS

| 1,849,786 | A  | 3/1932  | Bloede |
| 3,301,292 | A  | 1/1967  | O'Connor |
| 4,986,997 | A  | 1/1991  | Posner |
| 5,284,765 | A  | 2/1994  | Bryan et al. |
| 5,952,230 | A  | 9/1999  | Kim |
| 6,070,815 | A  | 6/2000  | Miyatake |
| 6,384,301 | B1 | 5/2002  | Martinell |
| 6,582,159 | B2 | 6/2003  | McKinnis |
| 6,684,564 | B1 | 2/2004  | Hirahara |
| 7,000,513 | B2 | 2/2006  | Zelinski |
| 7,150,993 | B2 | 12/2006 | Davis |
| 7,303,916 | B2 | 12/2007 | Marton |
| 7,402,734 | B2 | 7/2008  | Martinell |
| 7,658,033 | B2 | 2/2010  | Martinell |
| 2002/0120961 | A1 | 8/2002 | Ranch |
| 2002/0155595 | A1 | 10/2002 | Adelberg |
| 2002/0164798 | A1 | 11/2002 | Eudes |
| 2003/0005479 | A1 | 1/2003  | Kato |
| 2003/0104101 | A1 | 6/2003  | Matthews et al. |
| 2004/0043117 | A1 | 3/2004  | Cope |
| 2004/0267457 | A1 | 12/2004 | Timmis et al. |
| 2005/0005321 | A1 | 1/2005  | Martinell |
| 2005/0032224 | A1 | 2/2005  | Davis |
| 2005/0246786 | A1 | 11/2005 | Adams |
| 2006/0005273 | A1 | 1/2006  | Rudrabhatia |
| 2007/0033672 | A1 | 2/2007  | Bohning |
| 2008/0121742 | A1 | 5/2008  | Foster |
| 2008/0179435 | A1 | 7/2008  | Martinell |
| 2008/0182330 | A1 | 7/2008  | Martinell |
| 2008/0256667 | A1 | 10/2008 | Martinelle |
| 2009/0029449 | A1 | 1/2009  | Adams |
| 2009/0142837 | A1 | 6/2009  | Adams |

FOREIGN PATENT DOCUMENTS

| CN | 101035426 A | 9/2007 |
| CN | 201167561 Y | 3/2008 |
| EP | 1498025 A3 | 2/2005 |
| JP | 2001292717 A | 4/2000 |
| JP | 2002119886 A | 10/2000 |
| WO | WO02/00010 | 1/2002 |
| WO | PCT/US2005/019007 | 3/2006 |
| WO | WO2006022958 A1 | 3/2006 |
| WO | WO2009/042099 | 4/2009 |

OTHER PUBLICATIONS

Gwynne M. D. A quick Method for Extracting Plant Embryos from Certain Types of Seed. Nature Nov. 14, 1959. No. 4698.*
Bronwyn et al. *Agrobacterium tumefaciens* Mediated Transformation of Maize Embryos Using a Standard Binary Vector System. Plant Physiology May 2002, vol. 129, pp. 13-22.*
Zhang et al. The use of glufosinate as a selective agent in *Agrobacterium* mediated transformation of soybean. Plant Cell, Tissue and Organ Culture 56: 37-46, 1999.*
Eady et al. A comparison of four selective agents for use with *Allium cepa* L. immature embryos and immature embryo-derived cultures. Plant Cell Reports (1998) 18:117-121.*
Genovesi, Maize (*Zea mays* L.): In Vitro Production of Haploids, Biotechnology in Agriculture and Forestry, vol. 12, 1990.
Harrell, Automatic identification and separation of somatic embryos in vitro, International symposium on transplant production systems, Yokohama, Japan, Jul. 1992.
Perez, Rapid Excision of *Pritchardia* Embryos, PALMS, vol. 49 (1), 2005.
Jul. 9, 2009, Written Opinion.
Jul. 9, 2009, Search report for PCT US 09/03162.

\* cited by examiner

*Primary Examiner* — Annette Para
(74) *Attorney, Agent, or Firm* — R. Kody Jones

(57) ABSTRACT

The invention relates to rapid and efficient methods and apparatuses for displacing target plant materials from seeds. In one embodiment, the invention relates to methods and apparatuses for displacing embryos from maize seeds. In yet another embodiment, the displaced embryos can be propagated and regenerated into plants.

10 Claims, 12 Drawing Sheets

METHOD AND APPARTUS FOR EXTRACTION OF PLANT EMBRYOS

CROSS REFERENCE TO RELATED APPLICATIONS

This application claims benefit of U.S. Provisional Application Ser. No. 61/128,695 filed May 23 2008, and PCT/US2009/003162, international filing date May 22, 2009, which are incorporated herein by reference in their entirety.

FIELD OF THE INVENTION

The invention relates to a method and apparatus for extracting tissue from plants with a fluid. The fluid includes but is not limited to a liquid or a gas. More specifically, the method and apparatus are directed to isolating embryos from the kernel or seed. More particularly, the method and apparatus are useful for the production of displaced embryos or partially intact embryos from monocot seeds such as crop seeds like wheat, barley, oats, corn, rice, grass and the like. Still more particularly, the method and apparatus are useful for the production of isolated embryos that form plants, their progeny, and seeds. Even more particularly, the method and apparatus are useful for the production of isolated embryos that germinate into transformed plants, their progeny, and seeds. The method and apparatus are particularly useful for extracting immature embryos from maize seeds.

BACKGROUND OF THE INVENTION

In research and development of maize and other monocots, the manual extraction of embryos is most often still employed. Standard practice for the excision of maize immature embryos involves manual hand extraction, one embryo at a time. More specifically, the kernel cap is cut and removed to expose the endosperm tissue. A small instrument such as a metal scalpel is employed to move aside endosperm tissue and thus make the corn embryo visible and accessible for removal from the kernel. This is a slow process requiring considerable hand-eye coordination and dexterity in order to excise fully viable embryos. There have been some moves toward mechanization of this embryo extraction process by use of a suction device, which is used to individually suction the embryo from each seed. Mechanization of the process has been stymied by the fragility of maize embryos. One attempt to automate the embryo excision process is described in Monsanto U.S. Pat. No. 7,150,993, which discloses the use of a vacuum to excise immature maize embryos from each of the individual kernels with a vacuum aspirator. Although this system is adapted to slightly increase the speed of embryo excision beyond speed of scalpel driven manual labor, it is still an excessively slow and tedious excision process. There remains a need for a faster and more efficient method of excising embryos in a manner that produces little damage to the embryo.

SUMMARY OF THE INVENTION

The invention relates methods and apparatuses for removing or displacing target plant tissues. The methods and apparatuses of the invention can be applied to any monocot plants of interest. Preferred monocots include, but are not limited to, members of the family Poaceae, including grasses such as turf grasses and grain crops such as corn (maize), wheat, and rice. Particularly preferred monocots include Zea species, including corn (Zea mays), which has multiple kernels (seeds) typically held in rows on a corn ear.

In one embodiment, the target plant tissue is an embryo. The embryo can be mature, immature, intact, partially intact or a mixture of intact and partially intact embryos. In yet another embodiment, the method and apparatus are useful for removing immature maize embryos from ears of corn. In another embodiment, the removed embryo can be used for plant tissue culture or genetic transformation.

The invention also relates to methods and apparatuses that may be used to substantially isolate monocot embryos, such as corn embryos. The substantially isolated embryos may be used for genetic transformation or tissue culture. The methods and apparatuses disclosed herein are useful for high-throughput processing (i.e., substantially isolating large numbers of target tissues and/or processing large quantities of seeds).

In another embodiment, the invention relates to an apparatus for displacing an embryo from within a seed, comprising a holder for a seed; a device for generating a fluid stream; and a nozzle for directing the fluid stream at a maize seed, wherein the nozzle is coupled to the fluid generating device. The fluid includes but is not limited to a liquid, a gas, or a combination of liquid and gas. The fluid stream can be generated by any number of means including but not limited to a pump, a compressor, a pneumatic system and a hydraulic system. In another embodiment, the apparatus may be contained within an enclosure. This may facilitate the collection of the desired material and reduce the splattering of the seed material after it is contacted with the fluid stream. In yet another embodiment, a seed of interest may be contained within an enclosure. This stream can have a fluid including but not limited to a gas or air.

In another embodiment, the seed can be located on a plant, within a plant or removed from the plant. For instance, if the seed is a maize seed, the seed can be located on an ear of maize or it can be removed from the ear of maize. Seed on an ear of maize may be supported on the holder within the apparatus to make the individual seeds more stable, and accessible to the fluid stream.

In still another embodiment, the apparatus of the invention can be adapted to displace target plant tissue from a plurality of seeds. The apparatus is useful for an ear of maize, because the apparatus nozzle directs the stream of fluid at a plurality of maize seeds simultaneously. The methods and apparatuses of the invention provide an efficient, rapid and effective mechanism to remove target plant tissue, including but not limited to embryos.

In yet another embodiment, the holder and the nozzle and nozzle of the apparatus move relative to each other to direct the stream of fluid at a plurality of seeds in distinct locations. In yet another embodiment, the holder may be fixed in position and the nozzle may move relative to the holder. In still another embodiment, the nozzle may be fixed in position and the holder moves relative to the nozzle.

In still another embodiment, the apparatus comprises a collection device for collecting the displaced embryo. The collection device can be a container that can collect immature, mature or semi mature embryos and or other interior seed material. The embryos can be haploid or double haploid maize embryos.

In another embodiment of the invention comprises a method A method for breeding plants from embryos displaced from within maize seeds comprising displacing multiple maize embryos from maize seed proximately simultaneously, collecting the displaced maize embryos, identifying desired embryos, and; regenerating the embryos to form plants. This method can include the step of testing for the desired embryos with markers or by DNA extraction or by selection agents.

The invention also relates to a method comprising providing monocot seeds containing target plant material that have an opening in the pericarp or seed coat of the seeds; displacing target plant material from within a seed, and collecting the displaced target plant material. In yet another embodiment, the invention relates to a method comprising displacing target plant material from within a seed, and collecting the displaced target plant material.

The method is adapted to quickly displace a plurality embryos including but not limited to intact embryos and partially intact embryos. The embryos can be propagated via precocious germination of the embryo to develop into a plant. In another embodiment, the propagation can be for the production of embryogenic callus tissue from scutellum of the embryo, which then may be regenerated into a plant that can be fertile and used to produce further plants and seeds.

In another embodiment, the method allows the displaced embryo to be used in transforming embryo material such as its cells, the scutellum, or shoot apical meristem. In another embodiment, the method comprises treating a displaced embryo with a mitotic arrest-agent. In yet another embodiment, the method comprises germinating the embryo and treating the germinated plant material with a mitotic arrest agent. In still another embodiment, the method comprises treating embryogenic callus developed from the embryo with a mitotic arrest agent.

In yet another embodiment, the method can be for identifying haploid embryos displaced from within maize seeds. The method comprises displacing multiple maize embryos from maize seed proximately simultaneously, collecting said displaced maize embryos, and, identifying haploid embryos by the R-nj or R1scm2 or both scutellar phenotype marker. In still another embodiment, the method comprises treating haploid embryos to induce double haploidy.

DETAILED DESCRIPTION OF THE INVENTION

Definitions

Figure 1A:
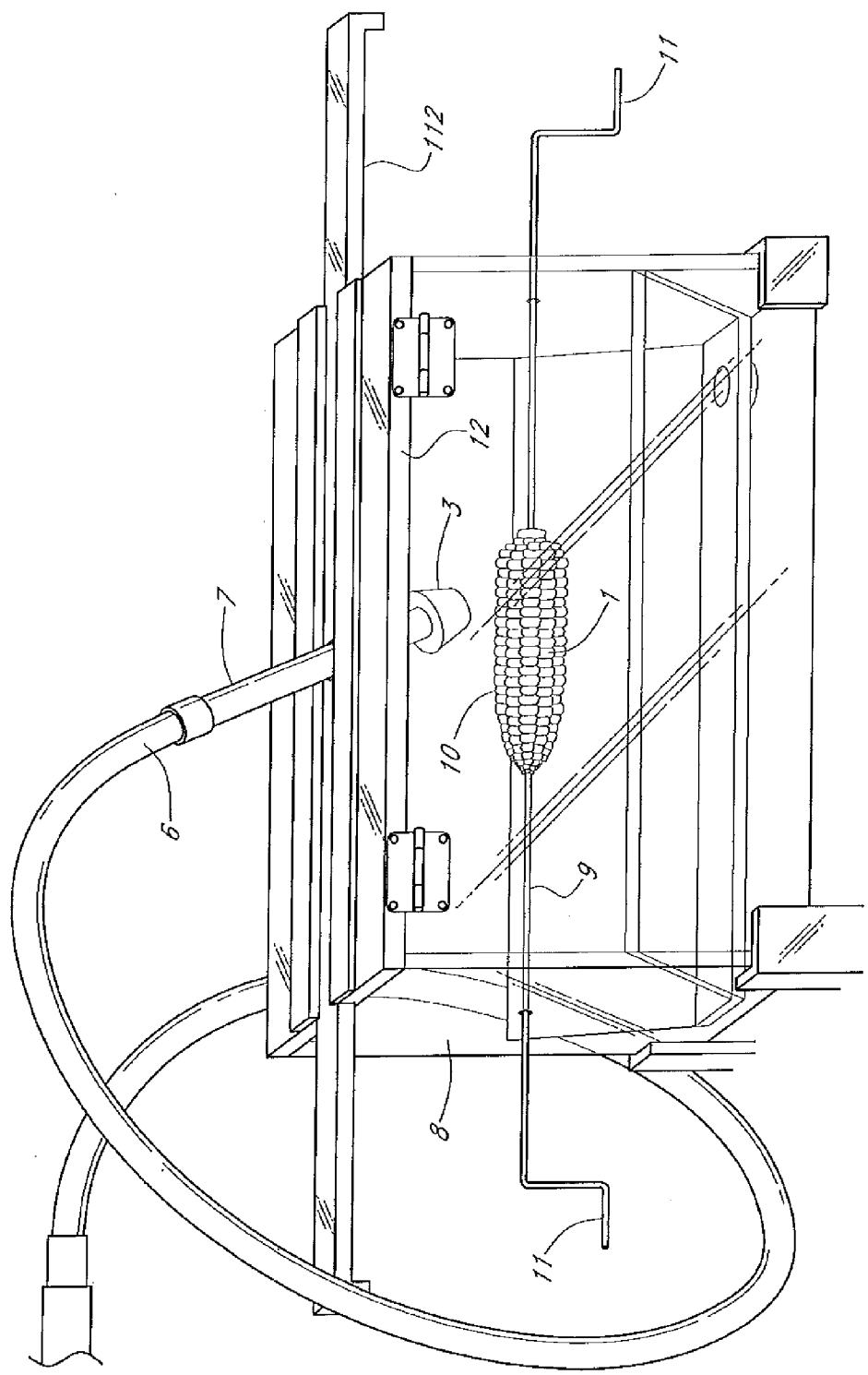
FIG. 1A. Enclosure and Dispenser System: Seed (1), Nozzle (3), Power-Wash Supply Hose (6), Dispenser-nozzle (7), Enclosure (8), Cob/Seed Holder (9), Cob/Ear (10), Cob/Ear Holder Handle (11), Ear/Dispenser Entry Door (12), Slideable Plate (112).

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of components in a mixture, and various temperature and other parameter ranges recited in the methods.

The phrase "displaced" refers to the processing of a target tissue (e.g., an embryo or other tissue explant) that resides in or forms part of a larger tissue complex (e.g., a seed) such that the target tissue is physically separated from at least half of the larger complex. In some embodiments, a displaced target tissue may be physically separated from at least about 50%, 60%, 70%, 85%, 90%, 95%, 96%, 97%, 98%, or 99% of the larger complex, or any fraction thereof. In other embodiments, the target tissue is displaced from more than about 80% to about 100%, about 90% to about 100%, or about 99% to about 100% of the larger complex, or any fraction in between. In some embodiments, the target tissue may be displaced from about 100% of the larger complex.

The invention relates to methods and apparatuses that can be used to increase the efficiency of excising target plant material from seed kernels. The apparatuses and methods of the invention can be used to rapidly excise and isolate intact embryos or partially intact. Most of the embryos are capable of developing into fertile seed producing plants.

Numerous viable embryos are quickly displaced from seeds with the methods and apparatuses of the invention. The methods and apparatuses work well with monocot plants including maize. The methods and apparatuses of the invention provide a means for rapidly excising and isolating large numbers of intact or partially intact, mostly viable mature or immature embryos. In other embodiments, the methods and apparatuses of the invention provide a means for isolating other internal seed material of interest.

The target plant material can be any desired material including but not limited to an immature embryo, a mature embryo, a partial embryo, an intact embryo, and a composition of embryo and other plant material. The method can be used to displace multiple embryos from seed proximately simultaneously. A fluid stream can be used to displace embryos. The fluid stream includes but is not limited to a liquid, a gas or a combination of liquid and gas.

Apparatuses for Extraction of an Embryo

The invention relates to an apparatus comprising a pressure source, and a fluid wash source. The pressure source may be a pumping system, a compressor, pneumatic or hydraulic system or any other means that is capable of providing pressurized fluid. The fluid may be a gas, a liquid or some combination of the two. In another embodiment, the apparatus further comprises a dispenser to direct the fluid wash output stream toward a seed. Further, the apparatus can comprise a seed or ear holder. The fluid enters an unmodified or modified seed, such as a split seed, and displaces the embryo and other interior seed materials from the kernel.

In another embodiment, the invention relates to apparatuses for the extraction of a plant embryo comprising: a pressurized source of fluid, wherein the fluid is directed at a seed so that the interior seed material can be displaced; and a collection device for collecting the desired seed material. A pressure source includes but is not limited to a pumping system, a compressor, pneumatic or hydraulic system or any other means which is capable of providing pressurized fluid. The fluid may be a gas, a liquid or a combination of gas and liquid.

In another embodiment, the apparatus further comprises a dispenser to direct the fluid towards a seed. The fluid contacts a seed, which can either be unmodified or altered in some way, and displaces the embryo and other interior seed materials from the seed.

The invention also relates to an apparatus for the extraction of an embryo comprising: a holder for a seed; a fluid stream generating apparatus; and a nozzle for directing the fluid stream at a seed, wherein the nozzle is coupled to the fluid generating device. The seed can be any seed for which the extraction of an embryo is desired including but not limited to maize, wheat, barley, oats, rice, and grass.

The holder can be made of any suitable material including but not limited to iron, steel, Teflon, composites, titanium, aluminum, nickel, cooper, tin, plastic, polyvinyl chloride, and polyolefins. The holder can be configured in a shape suitable to confine a seed or a plant containing a seed including but not limited to a circle, a rectangle, a square, a triangle, an octagon, and a pentagon.

The holder can be used to confine the seed, a seed contained on a plant, or a seed contained on the flower. For instance, a corn seed may be removed from the ear of maize prior to placing the seed in the holder. In another embodiment, the ear of maize can be placed in the holder.

In another embodiment, the seed can be altered to expose the embryo prior to placing the seed in the holder. A maize embryo and endosperm are enclosed within a maize seed, which is produced on a maize ear. The seed or kernel protects the seed interior material including fragile embryo. To extract the embryo from the seed, the seed's cap or top is manually or mechanically removed or sliced open to expose the embryo. The embryo can be excised at a variety of maturities and sizes. Embryo size (measured in millimeters) is a function of age, the parental genotype, and the environment. If sufficient care is not taken, the embryo may be damaged during the displacement process. Small immature embryos in the range of 5-11 days after pollination (D.A.P.), are generally more fragile than older and larger embryos, 12 days or more D.A.P. The methods and apparatuses of the invention are refined enough to displace, mature or small immature, which are fully viable maize embryos.

In another embodiment, prior to inserting the ear onto the holder, the seed is prepared for extraction of the embryo/seed material. A scalpel can be used to slice off the kernel crowns (tops) such that the power wash can penetrate the interior of the kernel with less resistance.

By removing the seed cap from the seed, the fluid's pressure only needs to be sufficient to displace the embryo from the seed's cavity. The pressurized fluid does not need to have an intense force that is adapted to split open the seed cavity. A high force splitting fluid pressure may reduce the percentage of viable intact embryos displaced by the present invention. If the embryo is not the desired material, it may be possible to increase the fluid pressure and avoid removal or slicing of the seed cap. This may require the level of the pressure to be pulsed or varied.

The device for generating a fluid stream includes but is not limited to a pump, a compressor, a pneumatic system and a hydraulic system. The fluid includes but is not limited to a liquid, a gas, a mixture of liquid and gas, and a gel. The liquid or gas can be any liquid or gas that does not damage or negatively affect the plant material and is gaseous or liquid at room temperature. The gas may be a combination or a mixture of two or more gases. The most common gas is air. The most common liquid is water.

The liquid or gas can be readily imbued with other chemicals, components, fluids, dispersed solids or solutions that are adapted to affect the plant material. For instance, the seed of a monocot and of most plants have encapsulated the embryo within a protective outer shell. Exposure of the protected tissue to the outside environment can result in loss of viability of the embryo due to any number of potential bacterial or fungal contaminates. One way to address this concern is to use an antibiotic or biocide e.g. Plant Preservative Mixture or some mixture of bacterial and/or fungal growth inhibiting compounds in fluid. For example, disinfectants, antibacterial or antifungal components and/or components that decrease contamination of the plant material, or components to increase the viability, stress tolerance, or growth habit or growth or cell division rate of the plant material can be used in the fluid of the present invention. These measures assist in decreasing the effects of contamination.

The fluid is at least one element that can be used to displace the exposed embryo from the seed or kernel. In one embodiment, the fluid is released from one or more devices and directed toward the seeds. The fluid can be forcefully propelled from the fluid dispensing device. The fluid dispensing device may include a stationary or directionally rotatable nozzle(s) or jet(s) adapted to direct the pressurized fluid toward the cut kernel(s) containing the desired embryo(s).

The amount and force of the fluid applied to the seeds is sufficient to isolate the target plant material, such as an immature embryo, from the seeds. Fluid may be applied to multiple seeds consecutively or simultaneously. The applied fluid can be continuous or non-continuous (for example, pulsed or wave-like force). The amount of fluid applied is preferably sufficient to overcome the adhesion of the target (e.g., embryo) and non-target (e.g., non-embryo tissue such as endosperm) from each other, thus allowing separation of the target and non-target tissues. Any suitable fluid or fluids may be employed for removal of the target tissue from its seed, and multiple fluids may be used in combination, sequentially or simultaneously.

An embryo or other desired material can be removed by a fluid through use of any of the following individually or in combination: a fixed, moveable or rotatable dispenser, ear or nozzle. Fixed shall mean that it is located in a particular position. Moveable shall mean capable of moving in the X, Y, or Z axis or in a combination of two of these axis. Rotatable shall mean capable of moving through the X, Y, and Z axis, for example movement in a circular or spiral pattern.

In another embodiment, the device for generating a fluid stream is a fixed position dispenser, whereby the dispenser points in only one direction but is adapted to be rotated around the ear while the ear is fixed or moveable. In yet another embodiment, the device for generating a fluid stream is a dispenser that is moveable and rotates around the ear, while the ear is fixed, or moveable. In still another embodiment, the device for generating a fluid stream is a dispenser that is fixed or moveable and rotates around the rotating ear while the nozzle on the dispenser is fixed, rotatable or moveable. In another embodiment, the device for generating a fluid stream is a dispenser in a fixed position with an ear also in a fixed position, wherein both the ear or dispenser are moveable. A number of other permutations are equally useful and within the scope of this invention.

The type of dispenser nozzle or jet may vary in diameter and length to accommodate excision of an embryo at various stages of development from a seed. In one embodiment, a nozzle may contain a small circular orifice or aperture. The dispenser can have a tapered end and may be positioned up or down with respect to the distance from the tip of dispenser nozzle to the seed according to need.

In another embodiment, the fluid may be pressurized. The fluid may be pressurized within the device generating a fluid stream or the fluid may be channeled into a separate device where the fluid can be pressurized. The amount of pressure applied from a pressure source through the dispenser may vary. Any pressure that causes the displacement and removal of the embryo from the seed without making the desired plant material unusable can be used. Useful power wash output (pounds per square inch (p.s.i.)) may range from about 20-150, including 20, 25, 30, 35, 40, 45, 50, 55, 60, 65, 70, 75, 80, 85, 90, 95, 100, 105, 110, 115, 120, 125, 130, 135, 140, 145 and beyond. Based on the teachings disclosed herein, one skilled in the art would know that it would be possible with nothing more than routine experimentation to change the size of the dispenser, the diameter and shape of the dispenser nozzle aperture, the amount and form of fluid, the diameter or length of the tubing to carry the fluid to extract the embryos, and the pressure to isolate the immature embryos from seed. In each of these embodiments the fluid spray coverage and force adequately accommodates embryo removal. Most of the desired seed material is flushed from the cavity through the force of the fluid. This flushed material when dislodged from the ear is subsequently collected.

In yet another embodiment, the apparatus may further comprise a separation device or a filter that can be used to obtain the target plant tissue. The wash fluid may contain the desired material, such as immature embryos, and other undesired material, such as endosperm, glumes, and seed coat or pericarp tissues. Separation may be accomplished by one or more suitable techniques, including, but not limited to, separation by size exclusion (for example, by filtration in one or more filtering steps), separation based on hydrophobicity, hydrophilicity, lipophilicity, or other attractive forces, and separation by mass or density differentials (for example, separation by centrifugation, settling, and decanting). The separation step or steps can be optional, for example, where no additional isolation of intact or partial embryos is necessary for their use in tissue culture.

In still yet another embodiment, the apparatus may further comprise a sterilization device. In one embodiment, the sterilization device can be used to sterilize the liquid, gas or combination of liquid and gas prior to contacting the seed. In another embodiment, the sterilization device can be used to render bacterial and fungal spores inviable, which may be associated with the target plant tissue or the liquid or gas. Any protocol or device can be used to sterilize the wash fluid provided the bacterial and fungal spores are rendered inviable, and the target plant tissue in unaffected. The sterilization device includes but is not limited to devices that emit ultraviolet radiation, x-rays, microwave plasma radiation, electron beam irradiation, and radiation. In addition, the sterilization device may consist of a filter that can be remove bacterial, fungal, and viral matter. One or more than one filter of varying sizes may be used.

Hereinafter, unless otherwise designated the dispenser and the ear of the present invention is deemed to be fixed, rotatable or moveable or switchable between these parameters. The dispenser and ear in some embodiments remove the embryo one seed at a time; in other embodiments at least two or more embryos are simultaneously removed from the ear. Some embodiments envision simultaneous removal of most if not all embryos from the ear.

In one embodiment shown in FIG. 1A, the cob/seed holder (9) holds a corn ear (10) and rotates the ear and thus the seed/kernel (1) or kernels (1) past the wash dispenser nozzle(s) (7). Additionally, the dispenser(s) (7) is moveable so that the fluid (2) can be directed to different areas of the corn ear 10) while it is rotating. The rotation of the ear can be through any axis including the long or short axis. Alternatively, the rotation can be of the dispenser. In yet further embodiments, both the ear and dispenser can be moveable in at least one of the X, Y, and Z axes. The fluid (2) is dispersed so as to remove the interior of the seeds of interest on the ear.

More specifically, FIG. 1A shows a fluid supply hose (6), which is coupled to a dispenser (7), which may be coupled a nozzle (3) that is adapted to engage the dispenser. The dispenser (7) may direct or regulate the fluid (2) within an enclosure (8). The fluid supply hose (6) is coupled to a source of fluid. The fluid (2) may be stored in a tank, a cylinder, a container for storing gas, a container for storing liquid or any other suitable storage device. The fluid supply hose (6) may be of any desired length and can be made of any suitable material including, steel, plastic, iron, rubber, and a polyolefin. As shown in FIG. 1A, the fluid supply hose (6) is inserted into the enclosure (8) through an opening at the top of the enclosure (8). However, the fluid supply hose (6) can be inserted into the enclosure (8) through a side of the enclosure or through the bottom of the enclosure (8).

In one embodiment shown in FIG. 1A, the ear or cob (10) is stabilized on a cob/seed holder (9) and rotated by the cob/ear holder handle (11). This handle (11) can be adapted to be mechanically rotated or manually rotated. Mechanical rotation can be achieved by any means known in the art including but not limited to the use of an electric engine, a gas engine, a small engine, an electrical power source, a battery, a gas power source, a propane engine, and an engine powered by water.

As shown in FIG. 1A, in at least one embodiment, the cob/ear holder (9) is designed to be inserted into the enclosure (8) such that a portion of the cob/ear holder (9) is located outside the enclosure (8). In still yet another embodiment, the cob/ear holder can be designed such that a portion of the holder is located outside both ends of the enclosure. The cob/ear holder (9) may be symmetrically designed such that a similar length of the holder (9) is located outside both sides of the enclosure. In another embodiment, the cob/ear holder (9) can be designed such that only one end of the holder (9) is located outside the enclosure (8).

FIG. 1A depicts a handle (11) (which is optional) coupled to the cob/ear holder (9). A handle (11) can be located on both ends of the cob/ear holder or on a single end.

This particular enclosure shown in FIG. 1A has an entry door (12) for insertion of the ear or the seeds. The fluid dispenser (7) in this embodiment is coupled to a slideable plate (112) mateably engaged within the enclosure. This plate permits movement of the fluid dispenser (7), which maintains the fluid spray within the enclosure (8).

The enclosure (8) can be of any size including but not limited to circle, a square, a rectangle, a triangle, an octagon, oval, pentagon, hexagon, parallelogram, rhombus, kite, and trapezium. The enclosure can be of any size including but not limited to 2×2, 2×3, 2×4, 2×6, 2×8, 3×3, 3×4, 3×6, 3×8, 4×4, 4×6, 4×8, 5×5, 5×6, 5×8, 6×6, 6×8, and 8×8 feet. The enclosure (8) made by made of one single piece of material or multiple pieces of material. The enclosure (8) may be made of plastic, fiber glass, glass, rubber, polyolefin, polyethylene, polystyrene, HDPE, and wood. The enclosure may be capable of opening at any location including but not limited to the top, the bottom, the right side, and the left side.

Figure 1B:
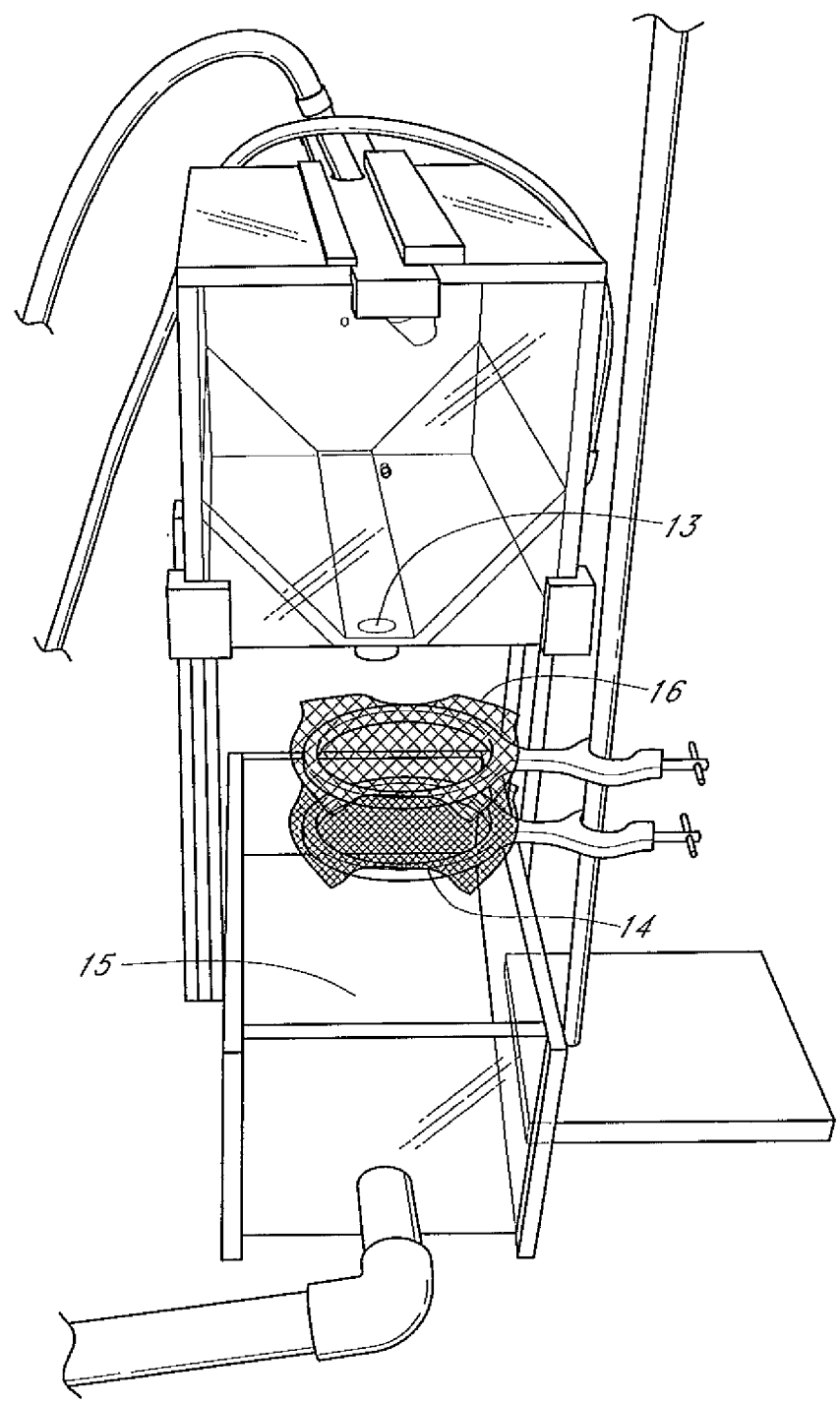
FIG. 1B. Embryo Capture System: Enclosure Drain (13), Collecting Receptacle (14), Wash Liquid Drain (15), Fluid Removable Screens (16).

FIG. 1B depicts one embodiment comprising one or more sieves or filters that are used to separate the rinse liquid, immature embryos, and other seed parts. The fluid washes the seed's embryo (4) from within the seed (1), along with a lot of other residual seed parts, into the enclosure (8). The enclosure (8) has an enclosure drain (13), which drains the fluid (2) and embryo (4) and seed parts into a collecting receptacle (14). In this embodiment, the receptacle (14) includes fluid permeable screens (16), which capture the embryos (4) and seed parts according to size as the fluid (2) passes through the receptacle (14). The clean fluid (2) then flows from the receptacle (14) into the wash liquid drain (15) for either disposal or reuse.

A fluid permeable screen can be any material or apparatus that separates the desired material from the undesired material including but not limited to a filter, a membrane, a sieve, a mesh, a net, paper filter, whatman paper, cloth, cheesecloth, and other filtration or distillation apparatuses. The fluid permeable screen can separate based on size, shape, flow intensity, or any combination of the properties recited above. The fluid permeable screen can be a filter including but not limited to a gravity filter, a pressure filter, a side stream filter, a surface filtration (single pass system that operates under pressure), a depth filter, and a continuous rotary filter.

FIG. 1B shows that the enclosure assists in channeling the displaced seed parts, inclusive of immature embryos into a specific location. The seed parts are channeled toward the opening in the enclosure, through which the wash containing the immature corn embryos and other seed parts can collect or flow. The seed parts are collectible from this opening or drain. In yet another embodiment of the invention, the seed parts can be accumulated in a collection receptacle adapted to receive such material.

Figure 1C:
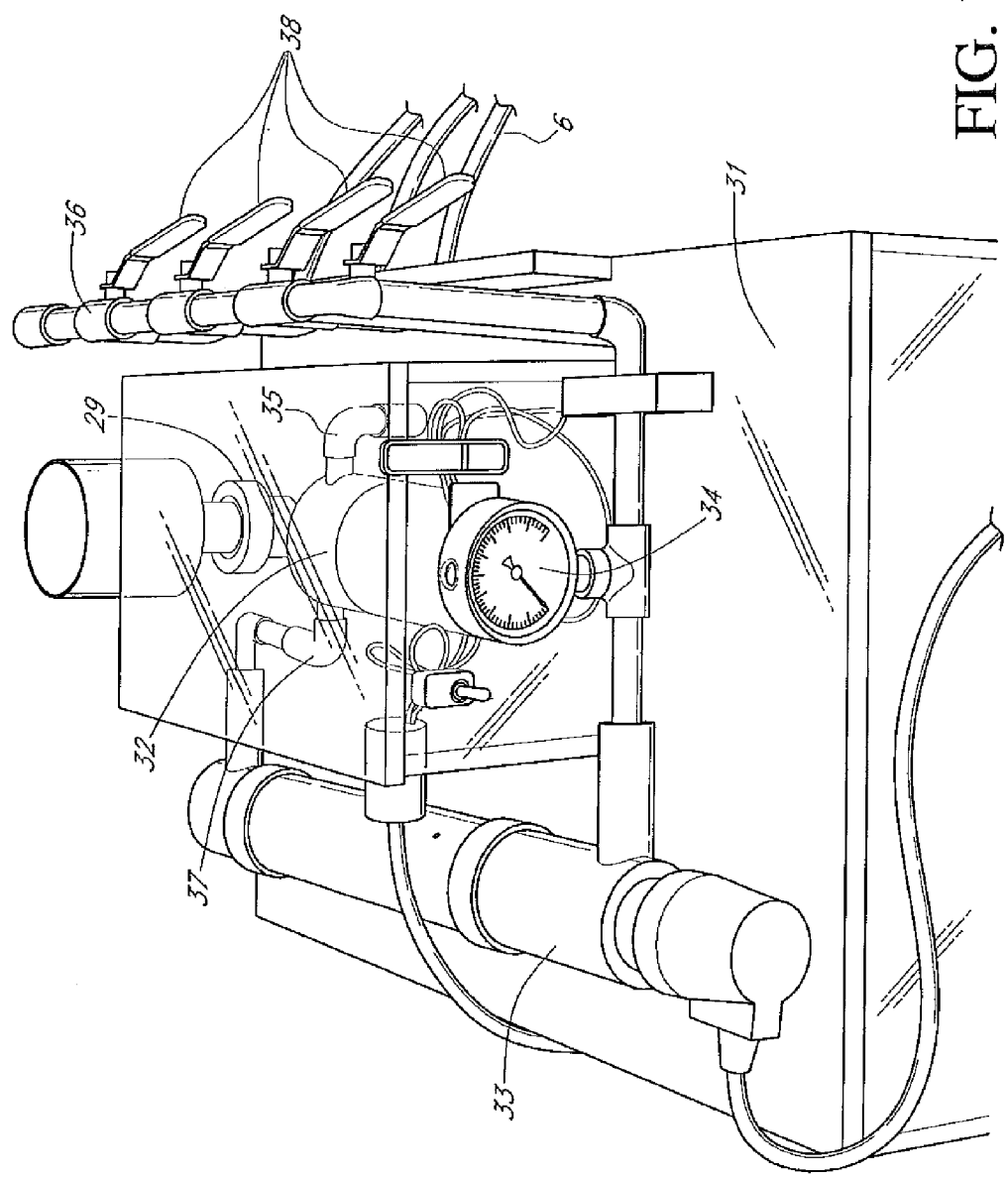
FIG. 1C. Power-Wash Liquid Pressure System: Inlet (29), Sterile Wash Container (31), Wash Pressure Pump (32), U.V. Wash Sterilizer (33), Wash Pressure Gage (34), Outlet (35), Manifold (36), Pump Outlet (37), Manifold Valve (38).
Figure 2A:
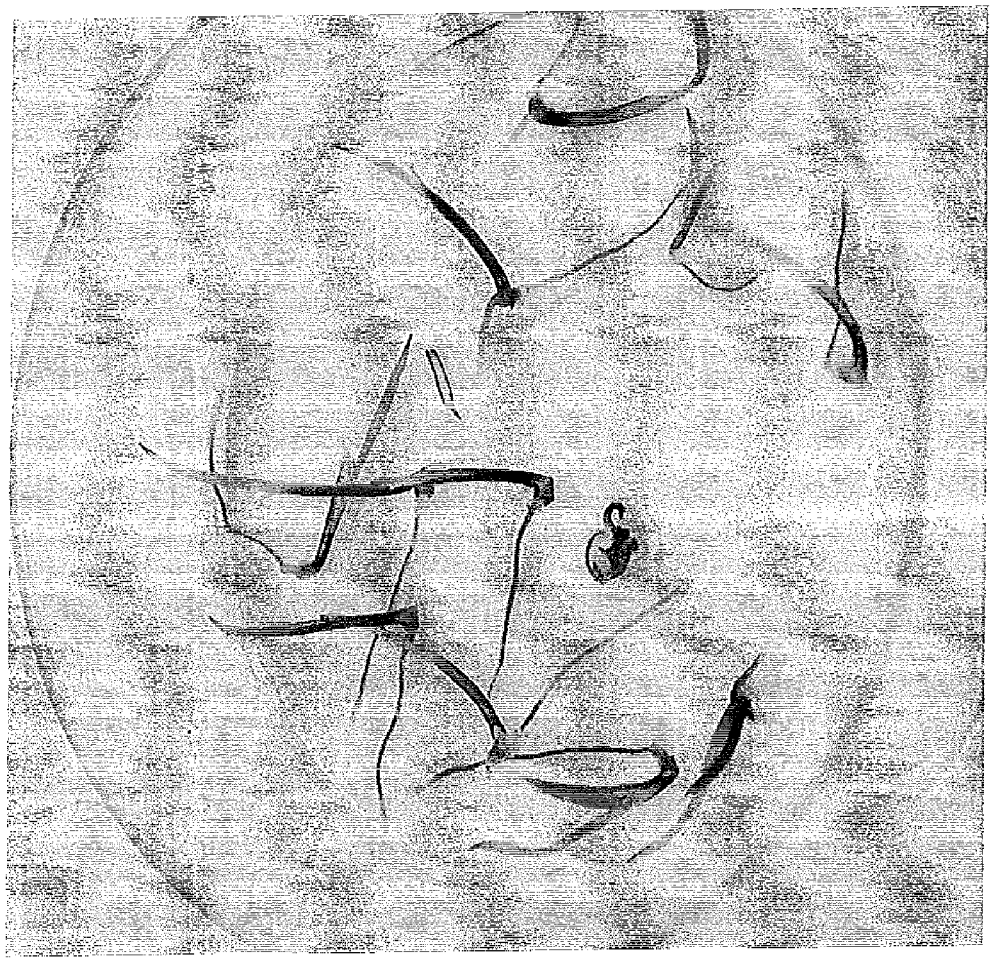
FIG. 2A. Precocious embryo (8 D.A.P.) germination followed by seedling development (7 days post embryo excision).
Figure 2B:
FIG. 2B. Precocious embryo (12 D.A.P.) germination followed by seedling development (48 days post embryo excision).

In the embodiment shown in FIG. 1C, there is U.V. sterilization system, which can be used to make bacterial and fungal spores inviable, and means for regulating the pressure (20-150 p.s.i.) or flow rate or velocity of gas or liquid or a mixture of each, and a dispenser spray apparatus, which may comprise a hose, dispenser, and/or nozzle. The dispenser device in one embodiment is moveable in a specific direction, or can be programmed in a specific spray pattern, with either a stable, steady, pulsing or variable velocity.

Various methods for producing pressurized fluids, either liquids or gases or mixtures, are well known in the art and this depiction does not intend to limit the invention to this method. FIG. IC depicts the fluid pressure system (30) employed by one embodiment of the invention. This fluid (2) is sterile water, which is stored in container (31), proximate the pressure pump (32), the ultra violet fluid sterilizer (33), the fluid pressure gage (34) and the manifold (36).

The fluid (2) flows into an inlet (29) in container (31) where the fluid (2) is stored. The fluid then moves through outlet (35), into pump (32), and through the pump outflow (37) into the sterilizer (33). The fluid (2) passes through the ultra violet light, out of the sterilizer outflow (31) to the manifold (36). The fluid (2) is released with manifold valves (38) into supply hoses (6) for fluid dispensation.

The pump (32) can be any type of apparatus that effectively moves and/or pressurizes the fluid including but not limited to a positive displacement pump, a high pressure pump, air-operated pump, bellows pump, diaphragm pump, flexible impeller pump, rotary vane pump, flexible liner pump, PTFE mutating disc pump, progressing cavity pump, plunger pump, pressures washer pump, and a spray nozzle pump.

The pressure gauge (34) can be any type of pressure gauge including but not limited to direct reading pressure gauge, indirect reading pressure gauge, traditional pressure gauge, filled pressure gauge, and commercial pressure gauge. Pressure gauges are available from a variety of commercial sources including Omega Engineering (Stamford, Conn.).

Figure 3A:
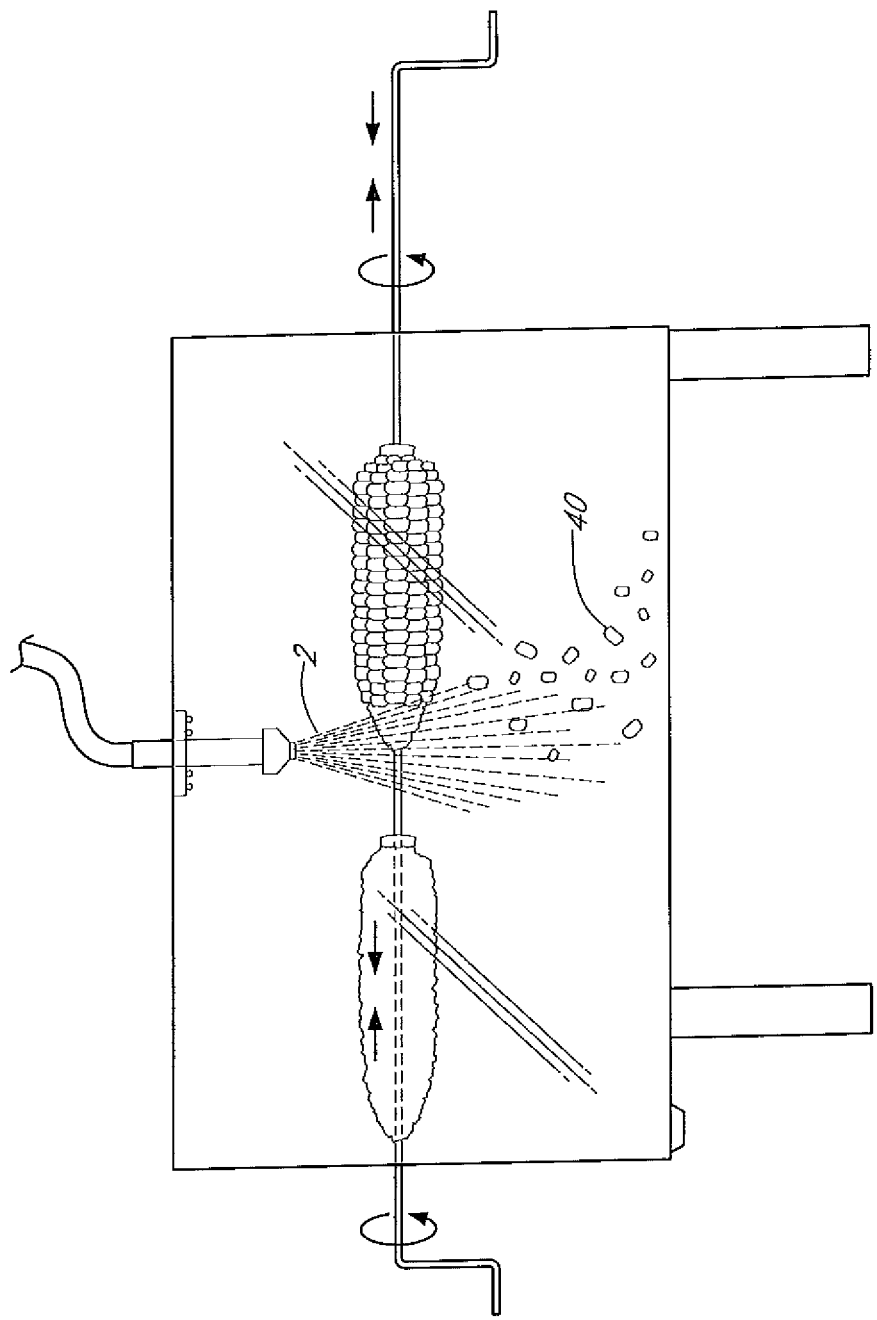
FIG. 3A. An embodiment of the present invention showing the handle, the ear, seed material, fluid (2), enclosure, means for rotation, dispenser, nozzle, side to side and rotational ear mobility, collection point.
Figure 3B:
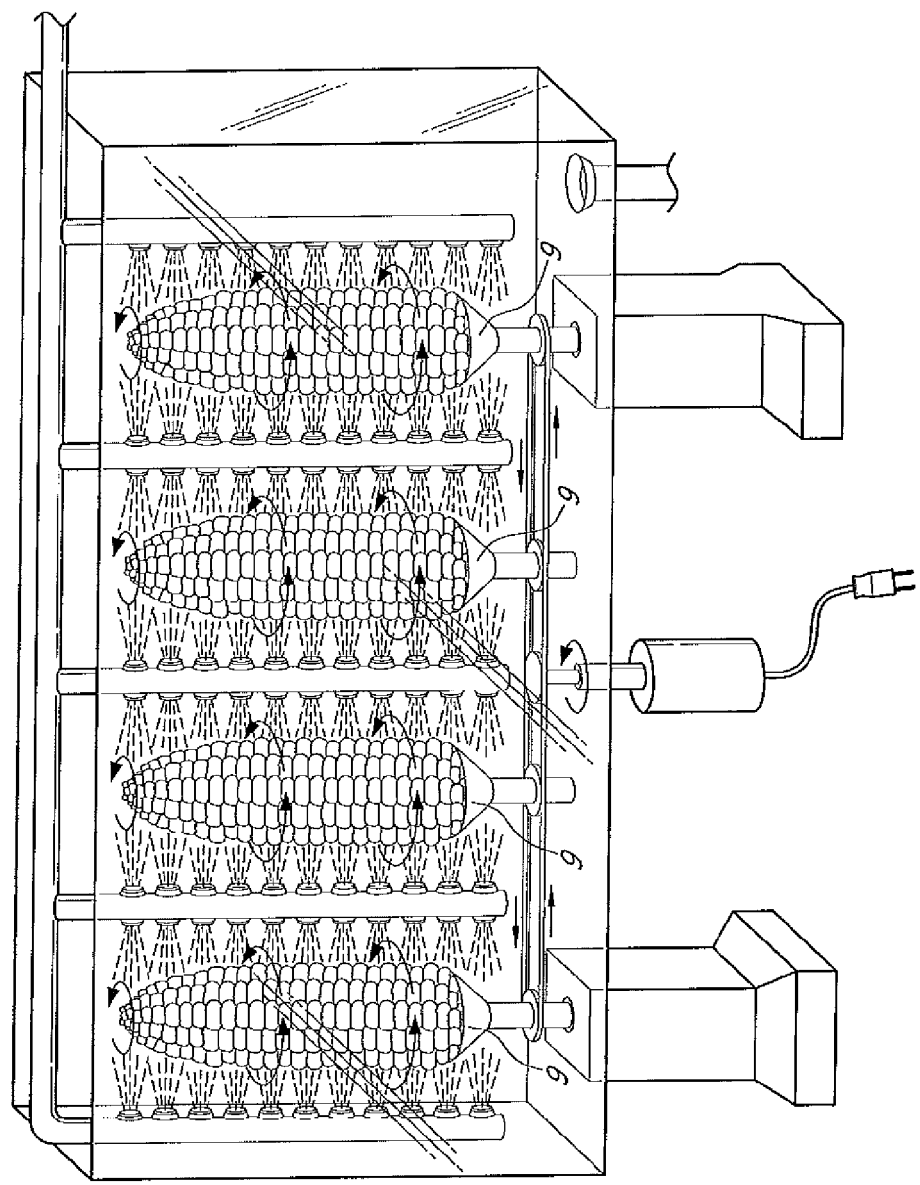
FIG. 3B. An embodiment of the present invention showing multiple ear displacing mechanism, 150 embryos per ear on four ears (any multiple can be employed) spray time of 3 minutes, results in 12,000 displaced embryos in an hour. This embodiment also shows, the automated handle, the ear, seed material, fluid, enclosure, means for rotation, dispenser, nozzles, rotational ear mobility, collection point.
Figure 3C:
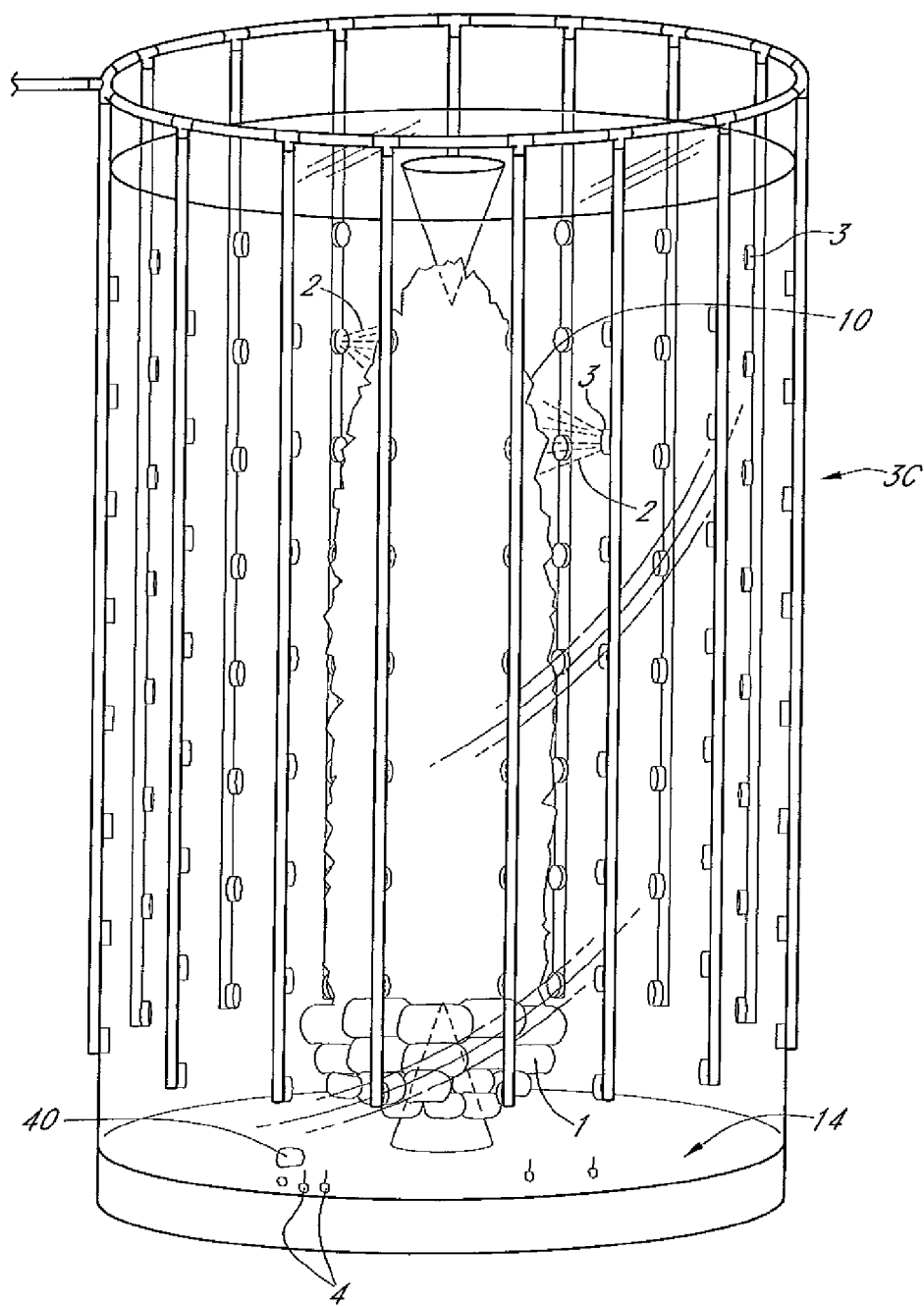
FIG. 3C. An embodiment of the present invention showing the handle/holder, the ear, seed material, fluid, enclosure, optional means for rotation, nozzles, collection point.

The following embodiments in FIG. 3A-C show generally different apparatus designs. FIG. 3A shows a couple of rotating corn ears that are being moved passed the dispenser. FIG. 3B shows a number of ears adapted to rotate while sprayed with the dispensers. FIG. 3C shows both a corn ear with the enclosure having the dispensers surrounding the exterior of the ear in such a manner that neither the ear nor the dispensers need to move. The enclosure into which an ear of corn may be placed may be adapted to control any deflected fluid spray. In an alternative embodiment of FIG. 3C, the enclosure is integral with the dispensers. In FIG. 3C, the dispensers or the ear or both can rotate, either in the same or opposite directions. Thus, if the dispensers rotate, the interior of the enclosure can rotate. Therefore, the embodiment has either a fixed dispenser or a device that allows for movement, and or rotation of either the ear or the dispenser(s) or both the ear and the dispenser(s). Additionally, any of the embodiments can have a conveyance system that moves a number of ears into contact with the fluid wash in an automated system.

FIGS. 3A-C show different embodiments of the apparatus of the present invention. In FIG. 3A, the corn ears or ears (10) are held by holders (9) that rotate. The ears (10) can be manually rotated or mechanically rotated by a power source. The direction of the dispenser nozzle(s) (3) releasing the fluid (2) can be adapted to be moveable, rotatable or fixed. In this embodiment, the dispenser (7) and/or the nozzles (3) can be angled. The rotation of the holder (9) permits the ear to be rotated so all seeds can be presented to the dispenser. In another embodiment, the force of the pressurized fluid can serve the dual purpose of flushing out the interior seed material and moving the ear/ears in a rotational direction due to the vector of the wash.

The fluid (2) may be a gas or liquid or a mixture of the two. Optionally, more spray devices/dispensers (7) can be included within this embodiment. These spray devices (7) can fixed or be rotatable and directionally moveable with the ear (10) being fixed, rotatable or moveable. A further option is where the dispenser(s) (7) can rotate around an ear (10), which is also rotating as shown in FIG. 3B.

In FIG. 3B, the dispenser(s) (7) are placed within a cylinder, circular, shell or an enclosure like-device with nozzles (3) or jets (3) adapted for forceful release of the fluid (2) against all sides of seeds (1) on the ear (10). In operation, the dispensers encircle the ear and move from one end of the ear to the other end. In another embodiment, the ear moves through a dispenser, wherein the dispenser does not have to move. In still yet another embodiment, the ear and the dispenser can both move. Thus, the device can have one or more nozzles (3) or jets (3) and the nozzles can move down the ear (10) or the ear (10) can rotate and/or move within the nozzles (3) or both can be in motion in the same or opposite directions. In this embodiment, the jet (3) or nozzles (3) can be directly or indirectly powered with a power source.

In another embodiment, the device can have numerous dispenser nozzles (3) or jets (3) positioned to surround the ear(s) (10) and neither the jets (3) nor the ear (10) requires rotation. The surface area of the spray being sufficient to cover the ear (10).

FIG. 3C shows yet another embodiment that has an encompassing enclosure filled with nozzles (3) that surround the ear while directing the pressurized fluid (2) at the seeds (1). This cylinder (or alternatively a box like enclosure or enclosure) can be stationary with the ears being conveyed through the circle of fluid (2). In another embodiment, this cylinder (or alternatively a box like enclosure or enclosure) can be rotating with the ears being conveyed through the circle of fluid (2). In yet another embodiment, the ear can be stationary with the cylinder spinning around or moving along the ear (10). In a number of embodiments, it is useful to direct the spray slightly toward the bottom of the enclosure to easily dislodge the seed material from the ear (10) and into the collection receptacle (14).

In these embodiments, the desired seed material is flushed from the kernel cavity through the force of the fluid (2) into the receptacle (14). The flushing of the seed material can be also be assisted by the rotation force of the ear. The flushed seed material (40), when dislodged from the ear (10), is subsequently collected.

The collected seed material (40) is then screened or filtered, such that the embryo material (4) is located. In some embodiments, the embryo material (4) will be the desired target plant material.

In yet other embodiments, the desired target plant material may be the non embryo material. Non-embryo material may be collected for any of a number of reasons. It may be useful for analysis, or testing or collection of protein, starch, or other seed materials including transgenic materials that are located within this non embryo material. Alternatively, both the non-embryo and the embryo material maybe collected. The position of the ears, the shape of the enclosure and the dispenser spray device can be adapted to direct the dislocated seed material in a confined area to facilitate collection. The displaced embryos and other seed material can be collected by employing screens adapted to separate the desired material from the undesired material in collection containers as shown in FIG. IC.

FIG. 1B is a side view of FIG. 1A without the ear and handle. This lower section of the enclosure comprises the seed material capture system (40). The seed material capture system (40) comprises an enclosure drain (13) that allows the seed material to be funneled to the collecting receptacle (14), which includes a wash liquid drain (15) to collect the used fluid dispensed.

A tray at the bottom of the enclosure can be employed to collect the dislocated plant seed material. Thereafter, if the seed material needs to be separated then screening or gravitational separation systems can be used.

Methods for Extraction of an Embryo

The invention relates to a method for displacing an embryo from a seed comprising applying a stream of fluid to a seed, wherein the fluid is either a liquid, gas or combination of liquid and gas, displacing an embryo from the seed; and collecting the displaced embryo. In yet another embodiment, the invention relates to a method for displacing embryos from within maize seeds comprising: displacing multiple maize embryos from maize seed proximately simultaneously, and collecting said displaced maize embryos. Any number of embryos can be displaced efficiently and rapidly using the methods of the invention. The methods of the invention can be used to displace a double haploid, a haploid or a diploid immature embryo.

The method and apparatus described herein can be used with a number of additional methods that employ material within a seed. These additional methods include but are not limited to methods for transforming internal haploid, diploid or a combination of haploid and diploid seed material; forming callus for plant regeneration; regenerating haploid/double haploid plant materials; or analysis of genetic material, oil, proteins, starch, foreign data and the like found within this internal material. Each of these methods is improved by quickly excising seed material including embryos via a force produced with a fluid.

The methods of the invention include a maize transformation system or a callus production system or if a portion of the embryos are suspected to be haploid embryos then a chromosome doubling system. The displacing transformation system is adapted to produce transformed plant material. The displacing callus production system is adapted to produce plant callus. The displacing embryos for the chromosome doubling system are adapted to produce a double haploid plant material. The displaced material can be employed to induce precocious germination, or for generation of desired cells or DNA, in vitro selection, and life cycle shortening processes.

Transformation

The present invention can be used on plants which are not necessarily induced haploids, which are selected or discarded because of the presence or the absence of a color maker. When used for transformation purposes the plants can be haploid or it can be germplasm, inbred or hybrid. Plant transformation is a method of introducing genetic material by known methods such as particle bombardment, whiskers, electroporation or *Agrobacterium* into various transformable plant tissues. A desirable transformable tissue is the immature maize scutellum available in displaced immature maize embryos. The power wash displacement is a method for quickly displacing a large number of immature embryos. Thus, overall laboratory transformation output can be increased, but with reduced cost and labor. However, due to the small size of these embryos, they can be difficult to locate within the debris of the internal seed material, unless appropriate separation and identification procedures are employed.

When transformation is carried out on the displaced immature embryo, genetic material such as a construct, plasmid, vector, transgene, chromosome and the like can be employed to provide the plant material within the embryo with a number of different traits such as resistance or tolerance (or if desired susceptibility) to herbicide, insect, virus, bacteria, fungus, nematode, drought, heat, cool, freezing, excessive moisture, salt stress and oxidative stress, stress tolerance or increased agronomic value traits like yield, moisture, stay green, stem strength, appearance, male sterility, dry down, standability, or different product profiles such as starch, oil, protein, ethanol production potential, amino acid composition, and the like.

Immature embryos can be displaced from seeds of transformed plants. These embryos may be tested further to confirm stable integration of the genetic (synthetic or otherwise is still defined as genetic) material. Generally, genetic material which is transformed has an event which includes some type of marker (which may be the target transgene or an additional transgene) which allows the desired material to be distinguished from the non desired material. Different types of markers can be employed including screenable markers such as encoding luciferase, coral genes or beta-glucuronidase uidA gene (GUS) or selectable markers can include mannose selection (P.M.I.), resistance to antibiotics such as kanamycin, hygromycin B, gentamycin or resistance to herbicides such as glufosinate (bar or pat genes) and glyphosate (EPSPS; CP4) and others known to those skilled in the art. Various markers are shown in U.S. Pat. Nos. 5,767,378, 5,550,318; 5,633,435; 5,780,708 and 6,118,047, all of which are incorporated herein by reference.

Transformation methods, protocols for embryogenic callus induction, and chromosome doubling protocols are well known to those of ordinary skill in the art. In spite of that, the following teachings of these processes are listed and incorporated by reference methods for making callus with materials from plants including maize U.S. Pat. Nos. 7,067,719, 6,730,824, 6,143,563, 5,134,074; transforming plants by introducing DNA into a plant genome includes many well-known methods known in the art such as microprojectile bombardment in U.S. Pat. Nos. 5,015,580; 5,550,318; 5,538,880; 6,160,208; 6,399,861, 6,403,865 *Agrobacterium*-mediated transformation which is taught in U.S. Pat. Nos. 5,635,055; 5,824,877; 5,591,616; 5,981,840 and 6,384,301; Whisker transformation which is taught in U.S. Pat. Nos. 5,302,523; and 5,464,765.

Callus and Seedling Formation

The displaced embryos of the invention can form callus or to provide for germination and seedling development. To accomplish this, the displaced embryo material is placed in contact with plant tissue culture media such as those described by Murashige and Skoog (M.S medium), or Chu et al (N6 medium), or Gamborg et al. (B5) or other tissue culture salt mixtures or hydroponics (Hoegland) solution, inclusive of carbohydrate sources (e.g., sucrose, maltose, etc.). These facilitate rapid germination, growth and development of the resulting seedlings. Additionally it may be possible to include one or more cytokinin (e.g., Kinetin, Zeatin, 6-Benzylaminopurine, thidiazuron) or auxin (e.g., 2,4-Dichlorphenoxyactic acid, Alpha-Naphthalene Acetic Acide, Indole-3-Butyric Acid, Indole-3-Acetic Acid) or Giberellic Acids (e.g. GA3) plant hormones or various combinations of plant hormones in the plant culture medium for given periods of time to 1) induce embryogenic callus development from the scutellum or embryo axis or 2) to impact cell division within the shoot apical meristem or 3) to enhance growth and development of the resulting seedling. The induced embryogenic callus can be transformed and/or regenerated to form plants and seeds. Alternatively, the cells, scutellum, shoot apical meristem of the displaced embryo or the embryo itself can be genetically changed if desired. Such material can be transformed, mutagenized, chemically treated or the like and then employed to regenerate a plant, preferable one capable of producing pollen and seeds (unless sterility was the desired change.)

Analyzing

Power wash displaced embryos and other interior seed material can be analyzed directly. The analysis may be for the identification, separation and selection of: embryos or other internal seed material. The phenotype of the seed such as waxy, high or low phytic acid, oil, protein, amino acids, or other starch qualities of the seed material, or a phenotype uniquely associated with the presence or absence of a transgene.

Breeding

The breeding method includes the steps of early harvest of ears, extraction of embryos with a quick embryo extraction apparatus such as the power washer shown in the Figures and analysis of the extracted material for selection. One method embodiment of rapid breeding process comprises selection of transgenes in the embryo by placing the embryo in media with agents that select for the transgenes. It has been found that these early embryos can be selected for the presence of at least two and often three or more transgenes in a single media selection step. For example if three transgenes are desired in the embryo and the transgenes in the segregating material may have a glyphosate resistant gene, and a PMI (mannose) selectable marker associated with a disease or insect resistant gene, and a Pat or Bar selectable marker or gene, the desired triple transgenic material can be identified by placing the embryo on media comprising growth medium inclusive of glyphosate, glufosinate, and mannose. The embryos that carry these three markers will survive and the embryos without one or more of these genes will not survive. Thus breeding material or maize lines with these three genes can be identified and selected for further use in a very few days after pollination of the ear.

Those of ordinary skill in the art will understand that any number of other screenable or selectable markers and associated agents, herbicides, antibiotics, etc. can be employed to screen for different transgenes. Any type of transgene can be identified within the embryo if there is any means for selecting or screening for the transgene within the scope of the teaching of this invention.

The next generation of seedlings can be identified with use of the selection media within 8, 9, 10, 11, 12, 13, 14, 15, 16, 17, 18, 19 or 20 days or more after pollination. This method of breeding can shorten the breeding time by one to three weeks relative to early harvest of seed that does not have the embryo removed and germination into a seedling. As will be understood by those of skill in the art the apparatus for simultaneous embryo extraction allows for this substantial decrease in time and effort within the breeding cycle. This process also allows a method of purity testing of lines that may not be anticipated to be segregating, or that have silenced transgenes.

Seedling Formation

The displaced embryos of the invention can germinate and go through seedling development. To accomplish this, the displaced embryo material is placed in contact with plant tissue culture media or potentially inclusive of plant hormones such as those described above in Transformation section. These media and/or plant hormones are selected to facilitate rapid germination, growth and development of the resulting seedlings. Alternatively initiation of regeneration can wait and the cells, scutellum, shoot apical meristem can be genetically tested or genetically changed if desired. Such material can be transformed, mutagenized, chemically treated or the like and then employed to regenerate a plant, preferable one capable of producing pollen and seeds (unless sterility was the desired change.)

Analyzing

Power wash displaced embryos and other interior seed material can be analyzed directly. The analysis may be for the identification, separation and selection: embryos or other internal seed material. The genotype of the seed and/or the phenotype of the seed such as waxy, low or high levels of fatty acids, amylase, sterility, high or low phytic acid, oil, protein, amino acids, or other starch qualities of the seed material, or a phenotype uniquely associated with the presence or absence of a transgene can be determined. Based on these determinations certain embryos can be selected or discarded. This very early seed analysis provides substantial breeding time, effort, production cost, land use, and overall breeding speed and efficiencies. By harvesting seeds from segregating germplasm in the breeding process within, a few days after pollination, the breeding process takes substantially less time to develop useful maize material. This early harvest window can provide needed flexibility to develop progeny more quickly and to protect the seed harvest if weather conditions are not desirable. Once the ear is harvested the embryos can be extracted from the material and the non embryo material such as the pericarp (maternal DNA) and the endosperm can be identified and tested for desirable genotypes or phenotypes. Based on this testing or other analysis of the seed material or its DNA selections from the breeding material can be made. This early selection reduces the number of plants planted, tested, cultivated or harvested the following season.

Doubled Haploids

A much improved immature maize embryo extraction system is an important step in the process of collecting haploid material. In terms of the standard embryo excision protocol, an average sized ear of corn may require the typical laboratory worker to spend anywhere from 20 minutes to 40 minutes to individually extract and culture all embryos from a single ear. However, use of the power wash displacement system reduces the embryo displacement (ear processing time) down to about 1-3 minutes per ear.

Embryo extraction efficiency is important for haploid maize chromosome doubling methods including double haploid breeding processes. This is particularly true because the frequency of haploid embryo induction is often low. For example, a variety of haploid inducers such as KEMS, ZMS, WS14, K.H.I., RWS, RWK-76, Stock 6, etc. vary in haploid induction rates, generally ranging from approximately 2% to 10%. To detect the induced haploid seed, a phenotypic marker system employing anthocyanin genes is incorporated into the haploid inducer male parent. A number of regulatory (C1/P11 and R1/B1) and structural genes (A1, A2, Bz1, Bz, C2) are required for anthocyanin expression (Chen and Coe, Biochemical Genetics. 15:333-346, 1977, Procissi et al., Plant Cell, 9:1547-1557, 1997, Taylor and Briggs, Plant Cell, 2: 115-127, 1990, Dooner et al., Annual Review of Plant Genetics, 25:173-199, 1991, Panavas, et al., Genetics, v153. 979-991. 1999, Styles, Maydica 38:127-133. 1993, Piazza et al., Plant Physiology, 128:1077-1086, 2002, Cross and Alexander, Euphytica 33:577-582. 1984, Coe et al. 1988, The Genetics of Corn. 81-258. In: Sprague G F, Dudley J W (eds) Corn and Corn Improvement, 3$^{rd}$ ed. Amer. Soc. Agronomy, Madison).

Generally, many haploid inducers rely on the use of the R-nj anthocyanin marker haplotype to enable haploids to be identified in seed by the positional expression of anthocyanin pigmentation. Haploid seed exhibits anthocyanin pigmentation in the aleurone tissue in the cap or crown of the seed, but lack pigmentation in the scutellum of the embryo. Alternatively, diploid seed are pigmented both locations. At times, visual discrimination of anthocyanin expression in the seed parts can be problematic.

A list of scorable anthocyanin marker genes that are generally known to regulate anthocyanin expression in the seed includes: R-nj, R1-scm122, R1-scm2, R1-scm:3, R1-scm, R1-mb (marbled aleurone), R1-r:standard, R1-Randolph, R1-ch:Stadler, R1-d:Catspaw, A, C, R1-d:Arapaho, R1-nj, (R1-nj:Cudu), (R1-nj:Chase), R1-sc:124, R1-sup-R1-suppressible, R1 K10-11; R1 M-X1, R1-ch, R1-g, R1-lsk, R1-r, R1-sc122, R1-sc*5691, R1-sk:nc-2, R1-sk, R1-st. etc. and others known in the art. Alternatively, other anthocyanin markers provide for haploid identification at the seedling stage based the presence or lack of pigmentation in the roots of 3-5 day old seedlings (see Tyrnov and Zavalishina, DAN 276:735-738, 1984).

Depending on which of a number of known regulatory genes for anthocyanin expression in the seed that are employed, the purple coloration in the seed or embryo will appear at different stages of seed and embryo maturity. Thus, not all seed anthocyanin markers are useful in a haploid embryo rescue identification method because the identifying color is not evident in the early stages of embryo development. We have discovered that X26b=R1scm2 (unknown background), M242G=R1scm2 (W22 background), X17F=R1scm3, X19A=R1scm4, and X26C=R1sc122 anthocyanin seed marker haplotypes provide for scutellar pigmentation within 24 hours post embryo rescue of immature embryos (12 D.A.P.). In addition, introgression of the R1scm2 anthocyanin marker haplotype into a maize haploid inducer allows for identification of haploid embryos at least by 12 D.A.P. It is possible that some of the above color markers may provide for scutellar pigmentation even earlier.

The unfortunate infrequency of induction of haploid maize embryos makes each embryo important for chromosome doubling purposes. Hand extraction of immature embryos for the purpose of doubled haploid production is possible, but due to their small size and the huge number of haploid embryos required for double haploid breeding programs, this manual extraction is quite problematic. However, the present invention accumulates (in extremely high numbers) the most suitable plant part (the immature embryo) for use in chromosome doubling. The power wash displacement system displaces the immature embryo with its corresponding immature shoot. This displaced embryo material is desirable target material for mitotic arrest. Mitotic arrest permits chromosome doubling through exposure to culture conditions, the media, inclusion of chemicals or hormones to produce fertile maize doubled haploids. Doubling methods employing colchicine, nitrous oxide and other chemicals are shown in Gayen et al., "Chromosome doubling in haploids through colchicine," Maize Genet. Coop. Newslett., 68:65, (www.agron.missouri.edu/mnl/68/101gayen.html), 1994, WAN and WIDHOLM, Plant Breeding 114 (3):253-255, 1995, Kato, "Chromosome doubling of haploid maize seedlings using nitrous oxide gas at the flower primodial stage," Plant Breeding, 121:370-377, 2002; WO/2007/038075; and U.S. Pat. No. 7,135,615 incorporated by reference. Thus, the present invention, the power wash displacement system increases the use of doubled haploids in maize breeding by both increasing the efficiency of embryo extraction per unit of time and by reducing the cost of embryo extraction. In addition, the use of the R1scm2 color marker haplotype provides for the identification of immature haploid embryos and, thus, provides a highly useful color marker for immature haploid embryo identification. These immature haploid embryos can be used for chromosome doubling purposes.

The following examples that are provided to illustrate the invention, and are not intended to be limiting:

Example 1

Excision and Precocious Germination of Immature Embryos from 12 D.A.P. Embryos This example illustrates the use of a fluid wash system to excise/displace immature maize embryos from an ear of corn.

Sterilization of the Fluid Pressure Wash System:

Five gallons of 10% Clorox (6.0% Sodium Hypochlorite) solution was continuously re-circulated through the pump, manifold, hoses, and UV sterilizer system shown in FIGS. 1A-C for approx. 30 minutes. The Clorox solution was then evacuated from the system by running it out through the sprayer hose and box apparatus (FIG. 1A) and down into the drain.

Five gallons of sterile water was circulated directly through the system and out into the drain.

Five gallons of sterile Millipore water or tap water was continuously re-circulated through entire fluid system of the apparatus for 30 minutes then stored in a tank until used for the fluid pressure extraction of the embryos. Finally, the enclosure/spray box apparatus (FIG. 1) was rinsed with 70% ethanol and allowed to dry. The ear holder, spray tip (dispenser/nozzles), and tongs used to pick up the ear were sterilized in 70% ethanol for 5-10 minutes prior to use and allowed to dry.

Immature Ear Preparation:

Fifty-one immature hybrid ears of maize were harvested from the greenhouse 12 days after pollination (12 D.A.P.) and sterilized by immersing them in a 50% Clorox (6% Sodium Hypochlorite) solution for 20 minutes. The ears were then rinsed three times with sterile water at five minute intervals to remove the sterilizing solution. To ready the ears for embryo extraction in a laminar flow hood, the kernel caps were removed using a sterile scalpel, taking care not to cut into the embryo axis.

Excision of Immature Embryos.

Using sterilized tongs, the ear was placed inside the spray box apparatus and held in place using the rotisserie bars (ear holder) (FIG. 1). The liquid pressure spray system was adjusted via the manifold to approximately 90 p.s.i. Using the rotisserie apparatus, the ear was rotated while the dispenser nozzle focused a spray of fluid on the ear. The fluid was passed back and forth over the cut kernel surfaces until all embryo and endosperm contents were evacuated or displaced from the seed. The released diploid embryo and endosperm tissue was collected and then drained through both a 10 and 20 mesh sieves. Sterile water was sprayed onto embryos and debris collected on the 10 mesh sieve, in order to wash them through for capture on the 20 mesh sieve. The resulting embryos were quickly transferred to a filter paper saturated with 4 ml of liquid Murashige and Skoog (M.S.) tissue culture medium inside a Petri dish. The embryos were then cultured at 28° C. at a light level of 400 PPFD (Photosynthetic Photon Flux Density) with a 16 hour day for a period of 3 days.

Results:

Immature embryos from 51 ears were extracted over a period of two hours. While the vast majority of the embryos were intact, some scutellar pieces were broken-off from some embryos. In spite of the damage to some scutella, most embryo axis's remained in a viable condition in all ears.

The data in Table 1 illustrated the germination rates observed amongst the embryos from 25 ears. Given that all the embryos were excised in just one hour, these data demonstrate the efficiency of the system both in terms of the excision rate per unit of time and the high level of precocious germination observed among the displaced immature maize embryos.

TABLE 1

Embryo rescue and germination frequency from 25 ears.

| Ear Number | Number of Embryos Extracted | Number of Germinating Embryos 72 Hours Post Excision | Percent Germinating Embryos 72 Hours Post Excision |
|---|---|---|---|
| 1 | 104 | 96 | 92.31% |
| 2 | 209 | 200 | 95.69% |
| 3 | 89 | 89 | 100% |
| 4 | 115 | 109 | 94.78% |
| 5 | 142 | 138 | 97.18% |
| 6 | 221 | 209 | 94.57% |
| 7 | 112 | 105 | 93.75% |
| 8 | 129 | 129 | 100% |
| 9 | 109 | 108 | 99.08% |
| 10 | 82 | 78 | 95.12% |
| 11 | 99 | 97 | 97.98% |
| 12 | 114 | 108 | 94.74% |
| 13 | 153 | 152 | 99.35% |
| 14 | 139 | 135 | 97.12% |
| 15 | 116 | 112 | 96.55% |
| 16 | 120 | 115 | 95.83% |
| 17 | 92 | 91 | 98.91% |
| 18 | 105 | 94 | 89.52% |
| 19 | 123 | 122 | 99.19% |
| 20 | 83 | 82 | 98.80% |
| 21 | 203 | 202 | 99.51% |
| 22 | 83 | 81 | 97.59% |
| 23 | 124 | 123 | 99.19% |
| 24 | 93 | 93 | 100% |
| 25 | 112 | 111 | 99.11% |
| Totals | 3071 | 2979 | 97.00% |

Example 2

Excision and Embryogenic Callus Induction from 9 DAP (Days after Pollination) Embryos The genetic engineering of some corn lines was based upon the utilization of young (approximately 9 D.A.P.) embryos. These diploid embryos were quite small, ranging from approximately 0.5 to 1 mm in length, and, thus, were more fragile than the larger more robust 12 D.A.P. embryos (approx. 1-2 mm in length) described in Example 1. Thus, the power-wash displacement system was evaluated using a transformation competent corn line and immature embryos of a size suitable for plant transformation.

Both the disinfection of the power-wash system and corn ears as well as the power-wash displacement of immature embryos was conducted as described in Example 1. However due to the more fragile nature of these less mature embryos, the following power-wash pounds per square inch levels were evaluated with respect to embryo extraction: 20, 30, 35, 40, 60, 70, 90. The extracted immature embryos were evaluated for degree of intactness and cultured on tissue culture embryogenic induction medium No. 1 for 6 days in the dark at 28° C. The power-wash isolation of intact/viable appearing embryos and embryogenic response is noted in Table 2.

TABLE 2

Evaluation of various pressure levels of the power-wash fluid (p.s.i.) with respect to the extraction of intact/viable appearing immature embryos and competence for friable embryogenic response.

| Power-Wash Level (P.S.I.) | Displacement of Intact/Viable Appearing Immature Embryos | Friable Embryogenic Response |
|---|---|---|
| 20 | Yes | Yes |
| 30 | Yes | Yes |
| 35 | Yes | Yes |
| 40 | Yes | Yes |
| 60 | Yes | No |
| 70 | Yes | No |
| 90 | Yes | Yes |

The Intact/viable appearing immature embryos were isolated at all power-wash levels (p.s.i.). In addition, friable embryogenic responses were observed at all but two pressure levels (p.s.i) of power wash. These data indicated that the power-wash displacement system was suitable for the isolation of embryos of the appropriate size class for maize transformation and further, that these same embryos are capable of friable embryogenic response post the power-wash displacement process.

Example 3

Excision of Putative Haploid Embryos (18-20 D.A.P.)

Maize haploid inducer lines such as K.H.I., RWS, RWK-76, and ZMS may be utilized as a pollen parent to induce the development of maternal haploid kernels. The aforementioned haploid inducer lines carry the R-nj anthocyanin pigment locus that confers coloration in both the embryo and aleurone within the maize kernel. The R-nj marker haploid kernels can be identified by a unique anthocyanin pigmentation pattern wherein the haploid embryo was substantially colorless and wherein the aleurone in the cap region of the kernel was pigmented. In fact, the embryo may have a slightly colored caleoptile and still be a haploid. The scutellum of the embryo is the material that should remain colorless. In contrast, the diploid embryos have anthocyanin pigmentation both in the embryos and in the aleurone. The initiation of kernel pigmentation both in the greenhouse as well as the field was variable, in part due to environmental conditions, but generally begins approximately 18-20 D.A.P at our research location.

Our previous embryo extraction efforts have demonstrated that it is possible to differentiate haploid from diploid embryos based on a lack of embryo pigmentation approximately 24 hours post hand excision of embryos from 18-20 D.A.P. kernels. Therefore, the power wash system was evaluated to determine if embryos representing this degree of chronological maturity could be excised and germinated, and as well if haploid embryos could be identified post extraction.

Both the disinfection of the power-wash system and corn ears as well as the power-wash displacement of semi-immature embryos was conducted as described in Example 1.

Several different haploid inducers were used as pollen parents to cross onto ears of different corn lines. These corn lines were known not to exhibit any anthocyanin pigmentation in the kernel. Eighteen to 20 D.A.P. ears were placed into the power-wash apparatus and 90 p.s.i. pressure was used to excise large embryos (approx. 2-4 mm) from the kernels. The embryos from each ear were separately cultured on filter papers saturated with 5.5 ml of liquid M.S. tissue culture medium, inclusive of 100 μM abscisic acid, and incubated in a controlled growth chamber at 28° C. Fluorescent lighting (16 hr/day, 400 μmol m$^{-2}$ s$^{-1}$) was situated both above and below the cultured embryos. During the overnight period, the embryos were maintained in darkness. The next morning, pigmented and non-pigmented putative haploid embryos were identified, and the results are summarized in Table 3. The identified haploid embryos can be treated to induce double haploid production, planted and the seedlings developed.

Figure 4:
FIG. 4. Young maize seedlings derived from the precocious germination of 18-20 D.A.P. embryos excised with the present invention. The P.W.I.E.E system was used for embryo excision.
Figure 5:
FIG. 5. Putative haploid plants derived from the power-wash displacement system. All plants (approx. 35 days old post embryo excision) were previously subjected to a treatment with a mitotic arrest agent.

The data in Table 3 indicate that 18-20 D.A.P. kernels composed of nearly mature embryos, which were embedded in fairly firm endosperm tissue, were still capable of being extracted from the kernel with the power-wash displacement system. Furthermore, these data also demonstrate that putative haploid embryos as identified by their lack of scutellar pigmentation can also be efficiently excised with the power-wash protocol. The presumed induction rate observed in vitro matches the predicted in vivo induction rate. A haploid plant phenotype was observed on almost all plants derived from the putative haploid embryos, indicating the utility of the R-nj scutellar phenotype marker in identifying haploid 18-20 D.A.P. embryos. FIGS. 4 and 5 illustrate that 18-20 D.A.P. embryos extracted with the power-wash process were readily capable of germinating and developed into normal seedlings and plants, respectively.

TABLE 3

Power-wash isolation of 18-20 D.A.P. embryos and putative haploid induction results.

| Female Ear Identification | Excised Embryo Age DAP | Number of Embryos Extracted | Number of Unpigmented Putative Haploid Embryos |
|---|---|---|---|
| 1 | 19 | 111 | 20 |
| 2 | 20 | 107 | 11 |
| 3 | 19 | 42 | 10 |
| 4 | 20 | 22 | 2 |
| 5 | 19 | 94 | 13 |
| 6 | 19 | 118 | 14 |
| 7 | 20 | 56 | 6 |
| 8 | 20 | 72 | 0 |
| 9 | 20 | 47 | 2 |
| 10 | 20 | 122 | 2 |
| 11 | 18 | 52 | 6 |
| 12 | 18 | 40 | 2 |
| 13 | 18 | 20 | 3 |
| | | Total 903 | Total 91 |

Example 4

Fertility of Plants Derived from Power-Wash Excised Immature Embryos

The seed production capacity of plants derived from the power wash immature embryo excision process is an important factor in embryo rescue. Utilizing protocols for the disinfection of the power-wash system and corn ears as well as the method for power wash displacement of immature embryos as described in Example 1 above, immature diploid embryos were excised and placed on a filter paper saturated with 5.5 ml of M.S. liquid tissue culture medium and cultured at 28° C. under fluorescent light. Four to 6 days post excision, the seedlings were transplanted into soil and grown to maturity to assess fertility.

Figure 6:
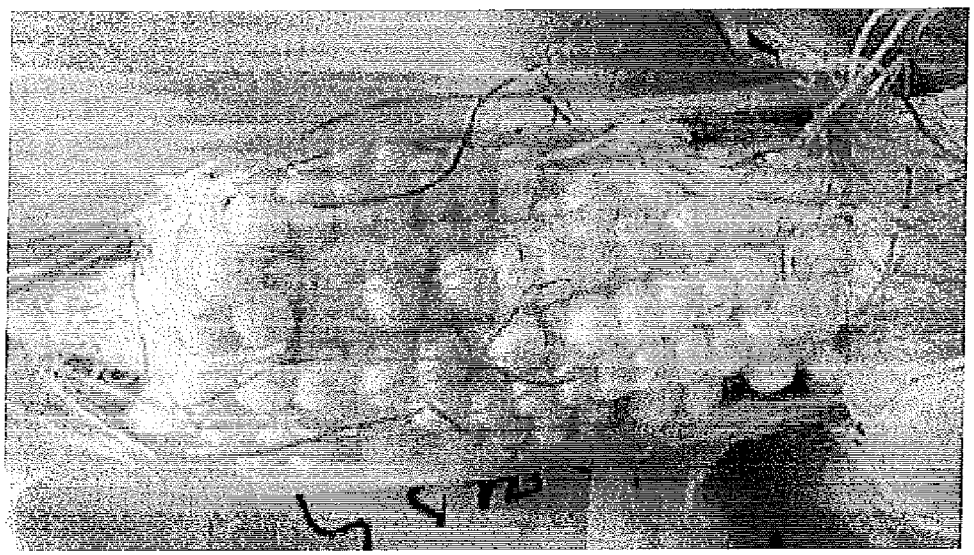
FIG. 6. Seed production on a control plant using pollen obtained from a power wash-derived embryo rescued plant.
Figure 7:
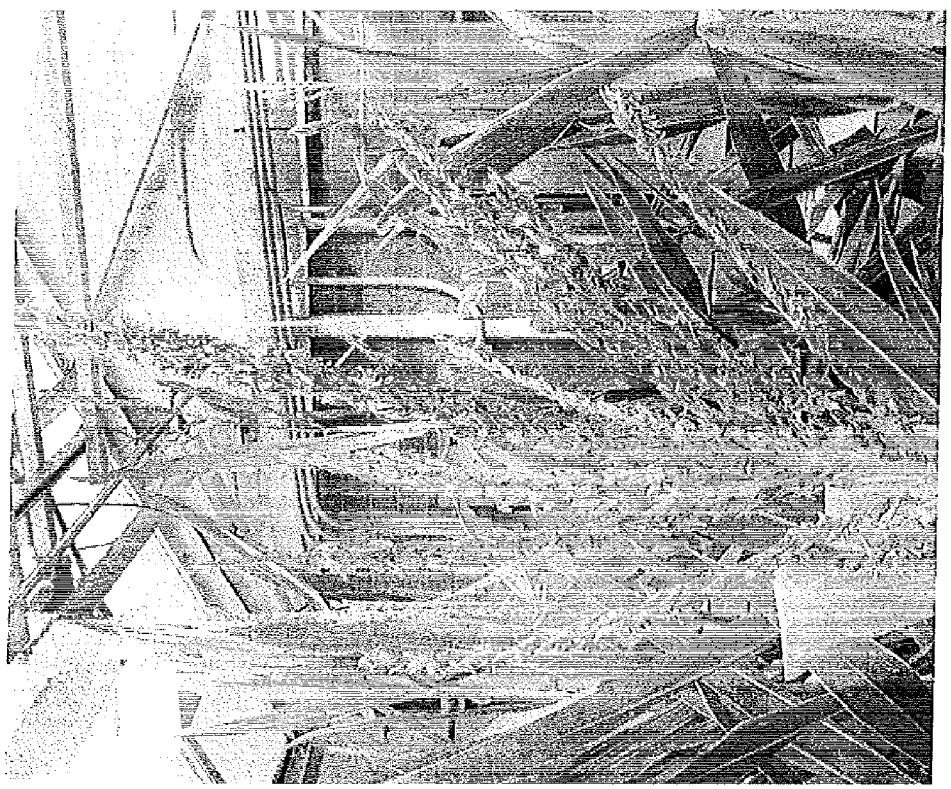
FIG. 7. Fertile tassel production on a power wash-derived embryo rescued plant.

Results:

Plants derived from the power wash embryo rescue process described above have been fertile. Examples of kernel production on the ear and anther extrusion from a tassel are provided in FIGS. 6 and 7, respectively.

Example 5

R-Locus Pigmentation Markers Genes and Precocious Pigmentation of the Immature Maize Scutellum Seed representing the following maize R-locus pigmentation marker genes/haplotypes R1scm2 (X26B), R1xcm2 (M242G), R1scm3 (X17F), and R1sc122 (X26C)} were planted in the field and the resulting plants were self pollinated. The resulting ears were harvested from the field 12 days after pollination (12 D.A.P.) and sterilized as described in Example 1. Immature diploid embryos were then excised by hand using a metal scalpel and placed in a Petri dish lined with a filter paper saturated 2 ml of M.S. liquid tissue culture medium. The dishes of immature embryos were then placed into a controlled growth chamber at 28° C. with fluorescent lighting (16 hr. day, 400 μmol m$^{-2}$ s$^{-1}$) situated both above and below the cultured embryos.

Results:

At the time of embryo excision, no anthocyanin pigmentation was observable either to the naked eye or via the use of a dissecting microscope on any of the immature embryos representing each of the four maize R locus haplotypes. However approximately 24 hours later, very dark anthocyanin precocious pigmentation was readily observed in the scutellar tissue of each cultured embryo. All R-locus haplotype marker lines demonstrated very strong scutellar pigmentation.

Example 6

Impact of Immature Embryo Extraction Methodology on Seedling Growth

Maize ears (approximately 12 D.A.P.) representing a variety of corn lines, were harvested from the greenhouse and sterilized as described in Example 1. Immature diploid embryos were randomly excised from kernels either by (1) hand extraction as described in Example 5 or (2) displaced and collected by the power wash excision process illustrated in Example 1. In each case, the excised diploid embryos from each ear were placed in petri dishes lined with a filter paper saturated 2 ml of M.S. liquid tissue culture medium. The dishes of immature embryos were then placed into a controlled growth chamber at 28° C. In the case of the power wash displaced embryos, 20 embryos were randomly selected and were moved to a second dish without any endosperm debris, but again containing a filter paper saturated with 2 ml of M.S. liquid tissue culture medium. Fluorescent lighting (16 hr/day, 70 μmol m$^{-2}$ s$^{-1}$) was situated above the plates of embryos. After several days of culture, the coleoptile length was measured for each embryo in each treatment group.

Results:

The coleoptile length data presented in Tables 4 and 5 illustrate that power wash derived seedlings grow at a rate that is comparable to that observed from hand extracted embryos.

TABLE 4

Coleoptile length as function of embryo excision/culture method.

| Extraction Method | Number of Embryos | Avg. Coleoptile Length |
|---|---|---|
| Ear #1. | | |
| Hand Extract | 22 | 8.4 |
| Power Wash Extract | 54 | 9.3 |
| Ear #2 | | |
| Hand Extract | 20 | 6.4 |
| Power Wash Extract | 44 | 9.4 |
| Ear #3 | | |
| Hand Extract | 20 | 16.2 |
| Power Wash Extract | 46 | 13.4 |
| Ear #4 | | |
| Hand Extract | 20 | 7.9 |
| Power Wash Extract | 28 | 10.6 |

TABLE 5

Statistical analysis of coleoptile length. (LSMeans Differences Student's T test)

| Method | | Least Sq Mean Coleoptile Length (mm) |
|---|---|---|
| Power Wash Extract | B | 10.7 |
| Hand Extract | B | 9.8 |

Example 7

Utility of the R1scm2 Haplotype Color Marker to Identify Immature Haploid Maize Embryos A maize line known not to condition precocious anthocyanin pigmentation in immature embryos was planted in the greenhouse and pollinated with pollen from a maize haploid inducer containing the R1scm2 haplotype color marker. Ears (approximately 12 D.A.P. (days after pollination) were sterilized as described in Example 1 and were excised by hand as described in Example 5. All dishes of immature embryos were then placed into a controlled growth chamber at 28 degrees C. Fluorescent lighting (16 hr/ay, 70 μmol m$^{-2}$ s$^{-1}$) was situated above the plates of embryos. Approximately 24 hours post immature embryo excision, the embryos were scored for anthocyanin pigmentation. Embryos were allowed to germinate in the same dishes and culture conditions and eventually were transplanted into the greenhouse.

Results:

Approximately 24 hours post excision, the majority of the embryos were intensely pigmented in their scutellar region as conditioned by the presence of the R1scm2 pigmentation marker. However a significant number of non-pigmented putative haploid embryos were also observed as reported in Table 6.

TABLE 6

Putative haploid (non-pigmented) immature identification rates on a per ear basis.

| Ear Number | Total Number Excised Embryos | Number of Colorless (Putative Haploid) Embryos | Colorless Embryo (Putative Haploid Induction) Frequency |
|---|---|---|---|
| 1 | 81 | 13 | 16.0% |
| 2 | 54 | 4 | 7.4% |
| 3 | 81 | 13 | 16.0% |
| 4 | 57 | 11 | 19.3% |
| 5 | 93 | 22 | 23.6% |
| 6 | 99 | 10 | 10.1% |
| 7 | 89 | 11 | 12.3% |
| 8 | 46 | 17 | 36.9% |
| 9 | 51 | 11 | 21.5% |
| 10 | 83 | 10 | 12.0% |
| 11 | 56 | 4 | 7.1% |
| 12 | 82 | 2 | 2.4% |
| 13 | 63 | 14 | 22.2% |
| 14 | 29 | 7 | 24.1% |
| 15 | 69 | 17 | 24.6% |
| 16 | 87 | 16 | 18.3% |
| 17 | 69 | 25 | 36.2% |
| 18 | 71 | 21 | 29.5% |
| 19 | 38 | 8 | 21.0% |
| Total/Avg. | 1298 | 236 | 18.18% |

The putative haploid embryos germinated readily under the conditions described above. Approximately 200 putative haploid seedlings were advanced to the greenhouse and observed for plant stature and male sterility in order to discriminate between the haploid and diploid ploidy conditions. Using these criteria, 194 out of 200 plants were identified as being true haploids. These observations indicated that the use of the R1scm2 haplotype color marker in a maize haploid inducer can be highly effective in the identification of immature haploid embryos (12 D.A.P.) within 24 hours post excision from the kernel.

Example 8

Power Wash Displacement, R1scm2-Derived Scutellar Pigmentation, and Immature Haploid Embryo Identification A maize line known not to condition precocious pigmentation in its immature embryos was planted in the greenhouse and pollinated with pollen from a maize haploid inducer containing the R1scm2 haplotype. Ears were harvested approximately 12 D.A.P. and sterilized as described in Example 1. Immature embryos were randomly excised from kernels either by (1) hand extraction as described in Example 5 or (2) displaced and collected by the power wash excision process illustrated in Example 1. The hand excised immature embryos were cultured in a small petri dish layered with a filter paper saturated with 1 ml of M.S. liquid tissue culture medium. Alternatively, the power wash excised embryos from each ear were placed into petri dishes lined with a filter paper saturated with 5 ml of M.S. liquid tissue culture medium. From the dishes containing power wash-derived immature embryos and immediately post the displacement process, 10 embryos per ear were sub-cultured to new dishes layered with a filter paper saturated either with 5 ml or 2.5 ml of M.S. liquid medium. All the dishes of immature embryos were then placed into a controlled growth chamber at 28° C. Fluorescent lighting (16 hr/day, 70 µmol m$^{-2}$ s$^{-1}$) was situated above the plates of embryos. Approximately 24 hours post immature embryo excision, the embryos were scored for anthocyanin pigmentation.

Results:

Observation of R1scm2 scutellar anthocyanin expression on diploid embryos cultured on a filter paper saturated with 5 ml of liquid M.S. medium and in the presence of endosperm debris indicated that those immature embryos had weak to moderate scutellar anthocyanin pigmentation. Alternatively, the power wash-derived diploid embryos sub-cultured onto a filter paper saturated with 5 ml of M.S. liquid medium and in the absence of endosperm debris, were more intensely colored. The power-wash derived embryos sub-cultured onto a filter paper containing 2.5 ml of M.S. liquid medium were quite intensely pigmented and comparable in coloration to the intensely pigmented hand extracted embryos, which served as a reference control. In both the hand and power wash extraction groups (2.5 ml M.S.), putative haploid immature embryos (non-pigmented) could be readily observed within 24 hours post excision of the embryos from kernels.

Example 9

Power Wash Displacement, R1scm2-Derived Scutellar Pigmentation, and Immature Haploid Embryo Identification A maize line known not to condition precocious pigmentation in its immature embryos was planted in the greenhouse and pollinated with pollen from a maize haploid inducer containing the R1scm2 haplotype. Ears were harvested approximately 12 D.A.P. and sterilized as described in Example 1. Immature embryos were randomly excised from kernels either 1) by hand extraction as described in Example 5 or 2) were displaced and collected by the power wash excision process illustrated in Example 1. The hand excised control immature embryos were cultured in a small Petri dish layered with a filter paper saturated with 1 ml of M.S. liquid tissue culture medium. Alternatively, the power wash excised embryos from each ear were placed into Petri dishes lined with a filter paper saturated with 5 ml of M.S. liquid tissue culture medium. From the dishes containing power wash-derived immature embryos and immediately post the displacement process, 10 embryos per ear were subcultured to new dishes layered with a filter paper saturated either with 5 ml or 2.5 ml of M.S. liquid medium. All the dishes of immature embryos were then placed into a controlled growth chamber at 28 degrees C. Fluorescent lighting (16 hr. day, 70 umol m$^{-2}$ s$^{-1}$) was situated above the plates of embryos. Approximately 24 hours post immature embryo excision, the embryos were scored for anthocyanin pigmentation.

Results:

Observation of R1scm2 scutellar anthocyanin expression on diploid embryos cultured on a filter paper saturated with 5 ml of liquid M.S. medium and in the presence of endosperm debris indicated that those immature embryos had weak to moderate scutellar anthocyanin pigmentation. Alternatively, those power wash-derived diploid embryos sub-cultured onto a filter paper saturated with 5 ml of M.S. liquid medium, but in the absence of endosperm debris were more intensely colored. Those power-wash derived embryos subcultured onto a filter paper containing 2.5 ml of M.S. liquid medium were quite intensely pigmented and comparable in coloration to the intensely pigmented control hand extracted embryos. In both the hand and power wash (2.5 ml M.S.) extraction groups, putative haploid immature embryos (non-pigmented) could be readily observed within 24 hours post excision of the embryos from kernels.

Evaluation of Pigmentation: Self-Coloreds.

Purpose:

The experiment was done to observe pigmentation in the scutellar (R-nj, R1scm2, and others) expression in different backgrounds corn lines and in addition, a sweet corn line and some other R locus haplotypes. Some of the lines are known to contain an anthocyanin inhibition gene(s) that knock out R-nj expression. The primary purpose of this experiment was to evaluate the utility of R1scm2 across the depth and breadth of Syngenta germplasm.

M&M:

Germplasm for pigment evaluation was provided. Seneca 60, a sweet corn line, and various self color lines were also evaluated, including lines which had varying degrees of color inhibition. The US and Canadian adapted germplasm, Seneca 60 and self color (M242G=R1scm2 in W22, X17F=R1scm3, X19A=R1sc124, X26C=R1sc122) lines were grown in the field and hand pollinated with pollen from either X26B or RWK BC1 (segregating 1:1 for R-nj/R1scm2) or in the case of the R locus haplotypes, were selfed. The US lines were grown in Janesville Wis. and were also crossed with pollen from the same RWK heterozygous line. All ears were harvested 12-13 days after pollination. The ears were shipped overnight (on cool packs) to another location. The ears were sterilized in 50% Clorox 50% tap water for 20 minutes and then followed by 3 sterile water rinses for 5 min. each. Ears then had their kernel caps removed with a sterile scalpel and embryos were hand extracted using a sterile spatula in a laminar flow hood. All Z.E. were placed on 100 mm Petri dishes containing a filter paper saturated with 3 ml liquid M.S.+3% sucrose media and placed in a low light Percival set with 16 hours days and 28 degrees C. In some instances, 100 uM ABA+M.S. medium was used to attempt to enhance pigmentation.

Scoring of intensity is as follows:

1=Easy to score: Scutellum intensely pigmented overnight or at 24 hours post excision.
2=Scorable: Reduced scutellar pigmentation compared to above, but OK.
3=Not easy to score: Weak or partial pigmentation of the scutellum→hard to distinguish from absence of pigmentation.

Mixture of scutellar phenotypes: 1+2, 2+3

Results:

US Germplasm:

AA2359, AF3050, AF3448, AF4543, AF5108, AD1108, AX5290, GJ7031, DC4015, DD4153, DI4214, FA4211, FA4734, FF6096, FX6022, FX6305, HI4630, HI5723, IC3423, ID2072, ID2568, ID3260, ID3374, ID3461, ID5016, ID5199, IJ7010, LD7214, LL6011, LL6622, XA5489, XO5744. In all cases, the R1scm2 haplotype locus provided reasonable scutellar pigmentation. Segregation appeared Mendelian.

As noted previously, the lines varied in their degree of color inhibition. Non-color inhibited lines such as GENU 530, GENU632, GENU635, GENU 539, GENU012, Z12945 appeared to have good immature scutellar pigmentation with R1scm2. Color inhibited lines: GENU625 & GENU624 pigmented up a bit (more than R-nj) in immature scutellar and expression was enhanced (at least 625) with ABA, GENU108 had poor aleurone pigmentation and OK scutellar pigmentation with R-nj in older embryos and good embryo and aleurone pigmentation with R1scm2, FSNU929 did not work well (no ABA used) but older R-nj embryos seemed to pigment well, FPWR284 did not work well. Conclusion: R1scm2 does provide some possible optimism with some, but not in all color inhibited lines. ABA in some instances may facilitate pigmentation in color inhibited germplasm. Seneca 60: Good scutellar pigmentation was observed.

Canadian Germplasm:

The following lines were used as females with the RWK BC1 germplasm source that was segregating 1:1 for R1scm2: 500160, 500065, 500160, 500115, 500234, 500129, 500143.

| Overall Segregation across a number of ears per female genotype. Genotype | No. Purple Embryos | Total Embryos Cultured |
|---|---|---|
| 500129 | 67 | 150 |
| 500161 | 21 | 60 |
| 500165 | 46 | 90 |
| 500143 | 9 | 70 |
| 500060 | 20 | 60 |
| 500160 | 45 | 90 |
| 500115 | 33 | 120 |
| 500234 | 90 | 180 |
| 500065 | 63 | 160 |

500143 appeared to be problematic with respect to penetrance and expressivity of pigmentation.

Other R Haplotypes:

Good scutellar pigmentation was observed in M242G=R1scm2 in W22, X17F=R1scm3, X19A=R1sc124, X26C=R1sc122. Note that R1sc122 had very nice pigmentation of very immature embryos.

| | | | | | All Data: | | | | | |
|---|---|---|---|---|---|---|---|---|---|---|
| Date | Female | Male | SIB, SELF | Target ZE | ZE Extracted | Aleurone (cap color) | # Purple Scutella | % Purple | Intensity | Notes |
| 22-Jun | BC1 (P) #4 | X NRWS | | 20 | 20 | Very Bright | 9 | 45% | 1 + 2 | some embryos are upside down and hard to score |
| HARVEST | PBJ (Y) NRWS | X PBJ (Y) X BC1 (P) #2 | SIB | 30 20 | 20 9 | No Color Slight Color | 0 3 | 0% 33.30% | 1 + 2 | some embryos are upside down and hard to score |

-continued

| | | | | All Data: | | | | | | |
|---|---|---|---|---|---|---|---|---|---|---|
| JULY 5TH | SENECA60 | X BC1 (P) #2 | | 50 | 46 | No Color | 22 | 47.80% | 1 | |
| WEDNESDAY | GENU530 | X BC1 (P) #2 | | 30 | 30 | Slight Color | 12 | 40% | 2 | |
| 13DAP | GENU530 | X BC1 (P) #2 | | 30 | 26 | No Color | 8 | 30.10% | 2 | |
| | PBJ (W) | X PBJ (W) | SIB | 20 | 20 | No Color | 0 | 0 | | Good R-nj expression |
| Evaluated 7-5 | PBJ (W) | X PBJ (W) | SIB | 20 | 20 | No Color | 0 | 0 | | Good R-nj expression |
| | PBJ (W) | X PBJ (W) | SIB | 20 | 20 | No Color | 0 | 0 | | Good R-nj expression |
| | Z21 | X BC1 (P) #7 | | 50 | 53 | Very Bright | 21 | 39.60% | 1 | |
| | 500129 | X BC1 (P) #7 | | 30 | 30 | Very Bright (Tip Only) | 14 | 46.60% | 1 + 2 | |
| | 500129 | X BC1 (P) #7 | | 30 | 30 | Slight Color (Tip Only) | 11 | 36.60% | 2 | |
| | 500115 | X BC1 (P) #7 | | 30 | 30 | No Color | 9 | 30% | 1 | |
| | 500115 | X BC1 (P) #7 | | 30 | 30 | No Color | 8 | 26.70% | 1 + 2 | |
| 23-Jun | RWK | X BC1 (P) #7 | | ALL | Not Ready | | | | | |
| | GENU632 | X BC1 (P) #7 | | 30 | No Seed Set | | | | | |
| HARVEST | GENU632 | X BC1 (P) #7 | | 30 | 22 | No Color | 11 | 50% | 1 | |
| JULY 5TH | GENU539 | X BC1 (P) #7 | | 30 | 30 | No Color | 17 | 56.60% | 1 | |
| THURSDAY | FSNU929 | X BC1 (P) #3 | | 30 | 30 | No Color | 0 | 0 | | Blocked r1scm2 |
| 12DAP | FSNU929 | X BC1 (P) #3 | | 30 | 30 | No Color | 0 | 0 | | Blocked r1scm2 |
| | Z12945 | X BC1 (P) #3 | | 30 | 30 | No Color | 12 | 40% | 1 | |
| Evaluated 7-6 | 500160 | X BC1 (P) #3 | | 30 | 30 | No Color | 15 | 50% | 1 + 2 | |
| | 500065 | X BC1 (P) #4 | | 30 | Not Ready | | | | | |
| | 500165 | X BC1 (P) #4 | | 30 | Not Ready | | | | | |
| | 500165 | X BC1 (P) #4 | | 30 | No Seed Set | | | | | |
| | 500160 | X BC1 (P) #2 | | 30 | 30 | No Color | 12 | 40% | 1 + 2 | |
| | 500115 | X BC1 (P) #2 | | 30 | 30 | No Color | 5 | 16.60% | 1 | |
| | 500115 | X BC1 (P) #2 | | 30 | 30 | No Color | 11 | 36.60% | 1 + 2 | Small Embryos |
| 24-Jun | PBJ (Y) | X PBJ (Y) | SELF | 30 | 30 | No Color | 0 | 0 | | Good R-nj expression |
| | PBJ (Y) | X PBJ (Y) | SELF | 30 | 30 | No Color | 0 | 0 | | Good R-nj expression |
| HARVEST | PBJ (Y) | X PBJ (Y) | SELF | 30 | 30 | No Color | 0 | 0 | | VERY Good R-nj expression |
| JULY 6TH | PBJ (Y) | X PBJ (Y) | SELF | 30 | 30 | No Color | 0 | 0 | | VERY Good R-nj expression |
| FRIDAY | PBJ (W) | X PBJ (W) | SELF | 30 | 30 | No Color | 0 | 0 | | Good R-nj expression |
| 13DAP | PBJ (W) | X PBJ (W) | SELF | 30 | 30 | No Color | 0 | 0 | | Good R-nj expression |
| Evaluated 7-7 | BC1 (P) #2 | X RWK | | ALL | Not Ready | | | | | |
| | BC1 (P) #1 | X RWK | | ALL | Not Ready | | | | | |
| | GENU632 | X BC1 (P) #2 | | 30 | 30 | No Color | 8 | 26.70% | 1 | |
| | 500234 | X BC1 (P) #2 | | 30 | 30 | No Color | 11 | 36.70% | 1 + 2 | |
| | 500065 | X BC1 (P) #2 | | 30 | 30 | No Color | 9 | 30% | 1 | |
| | 500160 | X BC1 (P) #2 | | 30 | 30 | No Color | 18 | 60% | 1 + 2 | |
| | 500129 | X BC1 (P) #8 | | 30 | 30 | Slight Color (Tip Only) | 16 | 53.30% | 1 | |
| | 500161 | X BC1 (P) #3 | | 30 | 30 | No Color | 12 | 40% | 1 + 2 | |
| From 7-5 | RWK | X BC1 (P) #7 | | ALL | 78 | Very Bright | 28 | 35.90% | | |
| From 7-5 | 500065 | X BC1 (P) #4 | | 30 | 30 | No Color | 12 | 40% | 1 | |
| From 7-5 | 500165 | X BC1 (P) #4 | | 30 | 30 | No Color | 12 | 40% | 1 | |

-continued

| | | | | All Data: | | | | | | |
|---|---|---|---|---|---|---|---|---|---|---|
| 25-Jun | BC1 (P) #7 | X RWK | | ALL | 87 | Very Bright | 42 | 48.30% | 1 | |
| | PBJ (Y) | X PBJ (Y) | SELF | 30 | 30 | No Color | 2 | 6.60% | 1 + 2 | Either good R-nj or bad R1scm2 in 2 ZE |
| HARVEST JULY 7TH | KHI B | X BC1 (P) #1 | | ALL | Not Ready | | | | | |
| | GENU012 | X BC1 (P) #1 | | 30 | 30 | No Color | 15 | 50% | 1 | |
| SATURDAY 12DAP | GENU012 | X BC1 (P) #1 | | 30 | 19 | No Color | 8 | 42% | 1 | |
| | GENU530 | X BC1 (P) #1 | | 30 | Not Ready | No Color | | | | |
| Evaluated 7-9 | 500143 | X BC1 (P) #1 | | 30 | 30 | No Color | 9 | 30% | 2 + 3 | |
| | 500060 | X BC1 (P) #1 | | 30 | 30 | No Color | 9 | 30% | 1 | |
| | 500065 | X BC1 (P) #1 | | 30 | 30 | Slight Color (Tip Only) | 9 | 30% | 1 | |
| | 500161 | X BC1 (P) #1 | | 30 | Not Ready | | | | | |
| | NRWS | X BC1 (P) #1 | | 30 | No Seed Set | | | | | |
| From 7-6 | BC1 (P) #2 | X RWK | | ALL | 95 | Very Bright | 35 | 36.85% | 1 | |
| From 7-6 | BC1 (P) #1 | X RWK | | ALL | 88 | Very Bright | 33 | 37.50% | 1 | |
| | RWK | X BC1 (P) #2 | | ALL | 104 | Very Bright | 40 | 38.50% | 1 | |
| 26-Jun | 500060 | X BC1 (P) #8 | | 30 | 30 | No Color | 11 | 36.70% | 1 | |
| | Z12945 | X BC1 (P) #8 | | 30 | 30 | No Color | 15 | 50% | 1 | |
| HARVEST JULY 8TH | Z12945 | X BC1 (P) #8 | | 30 | 30 | No Color | 15 | 50% | 1 | |
| | FSNU929 | X BC1 (P) #8 | | 30 | 30 | No Color | 6 | 20% | 3 | |
| SUNDAY 12DAP | FSNU929 | X BC1 (P) #8 | | 30 | 30 | No Color | 0 | 0 | | |
| | FSNU929 | X BC1 (P) #8 | | 30 | 30 | No Color | 10 | 33.30% | 3 | |
| Evaluated 7-9 | GENU632 | X BC1 (P) #8 | | 30 | 30 | No Color | 14 | 46.70% | 1 + 2 | |
| | 500065 | X BC1 (P) #7 | | 30 | 30 | Slight Color (Tip Only) | 14 | 46.70% | 1 | |
| From 7-7 | 500161 | X BC1 (P) #1 | | 30 | 30 | Slight Color (Tip Only) | 9 | 30% | 1 + 2 | |
| From 7-7 | GENU530 | X BC1 (P) #1 | | 30 | 13 | No Color | 6 | 46.20% | 1 | |
| From 7-7 | KHI B | X BC1 (P) #1 | | ALL | 56 | No Color | 24 | 42.90% | | |
| 27-Jun | RWK | X BC1 (P) #6 | | ALL | 27 | Very Bright | 11 | 40.70% | 1 | |
| HARVEST | RWK | X BC1 (P) #3 | | ALL | 46 | Very Bright | 17 | 37% | 1 | |
| JULY 9TH MONDAY 12DAP Evaluated 7-10 | BC1 (P) #8 | X K13 | | ALL | 205 | Very Bright | 90 | 43.90% | 1 | |
| 28-Jun | RWK | X BC1 (P) #8 | | ALL | 100 | Slight Color (Tip Only) | 40 | 40% | 1 | |
| | RWK | X BC1 (P) #4 | | ALL | 72 | Slight Color (Tip Only) | 38 | 52.80% | 1 | |
| HARVEST JULY 10TH | PBJ (Y) | X PBJ (Y) | SELF | 30 | No Seed Set | | | | | |
| | Z21 | X BC1 (P) #8 | | 50 | 30 | Slight Color (Tip Only) | 12 | 40% | 1 | |
| TUESDAY | Z21 | X BC1 (P) #3 | | 50 | 45 | Slight Color (Tip Only) | 23 | 51.10% | 1 | |
| 13DAP | GENU108 | X BC1 (P) #3 | | 30 | 11 | No Color | 7 | 63.60% | 1 | |
| | GENU108 | X BC1 (P) #3 | | 30 | No Seed Set | | | | | |
| Evaluated 7-11 | GENU625 | X BC1 (P) #3 | | 30 | 30 | | 11 | 36.60% | 2 + 3 | Only color a halo around the perimeter |
| | GENU625 | X BC1 (P) #3 | | 30 | No Seed Set | | | | | |
| | BC1 (P) #1 | X K13 | | 50 | 50 | Slight Color (Tip Only) | 20 | 40% | 1 | |
| | 500165 | X BC1 (P) #6 | | 30 | 30 | | 19 | 63.30% | 1 + 2 | |
| | 500165 | X BC1 (P) #6 | | 30 | 30 | | 15 | 50% | 1 + 2 | |

-continued

All Data:

| | | | | | | | | | | |
|---|---|---|---|---|---|---|---|---|---|---|
| | 500234 | X | BC1 (P) #6 | | 30 | 30 | | 12 | 40% | 2 | Had purpling in all embryos around axis like r-nj |
| 29-Jun | KHI B | X | BC1 (P) #6 | | 20 | 51 | Slight Color (Tip Only) | 27 | 53% | 1 | |
| | KHI A | X | BC1 (P) #3 | | 20 | 40 | Slight Color (Tip Only) | 12 | 30% | 1 | |
| HARVEST JULY 11TH WEDNESDAY 12DAP Evaluated 7-12 | | | | | | | | | | | |
| 2-Jul | PBJ (Y) | X | PBJ (Y) | SELF | 30 | 30 | No Color | 2 | 6.67% | 1 + 2 | Partial pigmentation |
| | PBJ (Y) | X | PBJ (Y) | SELF | 30 | 30 | No Color | 8 | 26.70% | 2 | Partial pigmentation |
| HARVEST | PBJ (Y) | X | PBJ (Y) | SELF | 30 | 30 | No Color | 3 | 10% | 2 | Partial pigmentation |
| JULY 15TH | PBJ (W) | X | PBJ (W) | SELF | 30 | 30 | No Color | 12 | 40% | 2 + 3 | Partial pigmentation |
| MONDAY | K13 | X | BC1 (P) #5 | | 30 | 30 | No Color | 16 | 53.30% | 1 | |
| 12DAP | BC1 (P) #3 | X | K13 | | 50 | 50 | No Color | 15 | 30% | 1 | |
| | 500165 | X | BC1 (P) #5 | | 30 | 22 | No Color | 9 | 41% | 1 + 2 | |
| Evaluated 7-20 | Birchler 05698 | X | Z21 | | 30 | 30 | No Color | 13 | 43.30% | 2 | Purple looks like r-nj expression |
| | Birchler 0545 | X | Z21 | | 30 | 30 | No Color | 16 | 53.30% | 2 | Purple looks like r-nj expression |
| | Birchler 0695 | X | Z21 | | 30 | 30 | No Color | 0 | | | |
| | Birchler 05698 | X | Z21 | | 30 | 30 | No Color | 5 | 16.60% | 2 + 3 | Purple looks like r-nj expression |
| 13-Jul | GENU012 | X | BC1 (P) | | M.S. | 50 | NO COLOR | 21 | 42% | 1 + 2 | Embryos were fairly small (10 DAP) |
| | FPWP284 | X | BC1 (P) | | M.S. | 50 | NO COLOR | 0 | 0 | NA | Biologically Absolutly no color |
| HARVEST | GENU635 | X | X26B | | M.S. | 5 | DARK COLOR | 5 | 100% | 1 | |
| JULY 25TH | | | | | M.S. DRY | 5 | DARK COLOR | 5 | 100% | 1 | |
| WEDNESDAY | | | | | ABA | 5 | DARK COLOR | 5 | 00% | 1 | |
| 12DAP | | | | | ABA DRY | 5 | DARK COLOR | 5 | 100% | 1 | |
| | GENU635 | X | X26B | | M.S. | 4 | NO COLOR | 0 | 0% | NA | |
| Evaluated 7-27 | | | | | M.S. DRY | 4 | NO COLOR | 1 | 25% | 1 | |
| | | | | | ABA | 4 | NO COLOR | 0 | 0% | NA | |
| | | | | | ABA DRY | 4 | NO COLOR | 0 | 0% | NA | |
| 17-Jul | 500143 | X | BC1 | | M.S. | 20 | NO COLOR | 0 | 0 | NA | No color on any of the embryos |

-continued

| | | | All Data: | | | | | | | |
|---|---|---|---|---|---|---|---|---|---|---|
| | 500143 | X BC1 | | M.S. | 20 | NO COLOR | 0 | 0 | NA | No color on any of the embryos |

Harvest
JULY
29TH
SUNDAY
12DAP
Evaluated
8-1

| Date | Female | Male | SIB, SELF | Media | ZE Extracted | Aleurone (cap color) | # Purple | % Purple | Intensity | Notes |
|---|---|---|---|---|---|---|---|---|---|---|
| 18-Jul | 500065 | X BC1 | | M.S. | 20 | NO COLOR | 11 | 55% | 1 | |
| | 500065 | X BC1 | | M.S. | 20 | NO COLOR | 8 | 40% | 1 | |
| Harvest | 500234 | X BC1 | | M.S. | 20 | NO COLOR | 12 | 60% | 1 | |
| July 30th | 500234 | X BC1 | | M.S. | 20 | NO COLOR | 15 | 75% | 1 | |
| Monday | 500234 | X BC1 | | M.S. | 20 | NO COLOR | 13 | 65% | 1 | |
| 12DAP | 500234 | X BC1 | | M.S. | 20 | NO COLOR | 12 | 60% | 1 | |
| | 500234 | X BC1 | | M.S. | 20 | NO COLOR | 7 | 35% | 1 | |
| Evaluated 8-1 | 500234 | X BC1 | | M.S. | 20 | NO COLOR | 8 | 40% | 1 | |
| | 500129 | X BC1 | | M.S. | 20 | NO COLOR | 7 | 35% | 1 | |
| | 500129 | X BC1 | | M.S. | 20 | NO COLOR | 8 | 40% | 1 | |
| | 500129 | X BC1 | | M.S. | 20 | NO COLOR | 11 | 55% | 1 | |
| | GENU625 | X BC1 | | M.S. | 15 | NO COLOR | 3 | 15% | 2 + 3 | |
| | | | | M.S. DRY | 15 | NO COLOR | 7 | 35% | 2 | |
| | | | | ABA | 15 | NO COLOR | 6 | 30% | 1 + 2 | |
| | | | | ABA DRY | 15 | NO COLOR | 4 | 20% | 1 | |
| | GENU632 | X BC1 | | M.S | 20 | NO COLOR | 5 | 25% | 1 | |
| | GENU539 | X BC1 | | M.S. | 5 | NO COLOR | 2 | 40% | 1 | |
| | FSNU929 | X BC1 | | M.S. | 20 | NO COLOR | 7 | 35% | 1 | |
| | | | | M.S. DRY | 20 | NO COLOR | 5 | 25% | 1 | |
| | | | | ABA | 20 | NO COLOR | 4 | 20% | 1 | |
| | | | | ABA DRY | 20 | NO COLOR | 7 | 35% | 1 | |
| | GENU012 | X BC1 | | M.S. | 9 | NO COLOR | 4 | 44% | 1 | Embryos were fairly small (10 DAP) Biologically |
| | Z12945 | X BC1 | | M.S. | 20 | NO COLOR | 11 | 55% | 1 | |
| | GENU624 | X BC1 | | M.S. | 10 | NO COLOR | 2 | 20% | 3 | |
| | | | | M.S. DRY | 10 | NO COLOR | 5 | 50% | 3 | |
| | | | | ABA | 10 | NO COLOR | 3 | 30% | 3 | |
| | | | | ABA DRY | 10 | NO COLOR | 6 | 60% | 2 + 3 | |

ABA: In some cases ABA enhanced pigmentation

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations that operate according to the principles of the invention as described. Therefore, it is intended that this invention be limited only by the claims and the equivalents thereof. The disclosures of patents, references and publications cited in the application are incorporated by reference herein.

Experiment 10. TID RACE
Purpose:
In the introgression of transgenes into various inbred backgrounds, the backcrossing process takes a considerable amount of time. If the generational timeline could be shortened and an additional generation gained on a yearly basis, then there is significantly improve. Thus the purpose of this experiment was to determine if there are any savings in time that can be achieved from protocols that employ embryo rescue of immature embryos and the early harvest of seed. This takes the form of a race between embryo rescued plants and fast track seed derived plants to tassel/anther anthesis.

M & M:
Ten varieties of maize plants were planted in pots on September 3. Approximately, 30 days after planting the one-half of the plants tasseled and were self-pollinated (see excel sheet for exact dates). Some lines did not make it to tassel and others did not nick (see excel sheet). On November 18$^{th}$ and with respect to the plants that were self-pollinated, one half of an ear was sawed off and brought into the lab and some immature embryos were hand extracted. 12-14 DAP embryos were hand extracted in the standard fashion and placed in 100 mm×25 mm Petri dishes saturated with 3 ml of MS+3%

Sucrose. The dishes were placed into a lighted Percival (400 umol) running at 83F and with a 16 hr. day until transplanted into flats. On December 9$^{th}$, ten embryo rescued seedlings from each surviving genotype were planted into the soil dirt greenhouse floor.

From the other half of the ear that was left on the plants, these ears were harvested on December 4$^{th}$. At that time the ear was placed into a growth chamber to be dried down (see dry down table below). On December 9$^{th}$, the ears were finished drying and 10 kennels from each surviving ears were planted next to their corresponding embryo rescued seedlings in the soil dirt greenhouse floor.

The plants derived from seed and the embryo rescue derived plants were watched very carefully to see when there tassels started to shed (please see excel sheet for data) pollen.

There were a large number of lines that did not nick or make it in the first part of the experiment, because of this the varieties that did not nick of maize plants were re-planted in pots on December 4th. Only one lines made it to tassel this time. The others did not nick (see excel sheet). The new line was kept in pots, the others where chopped down and thrown away. On the plant that was pollinated, half of the ear was sawed off and brought into the lab and the immature embryos hand extracted. 12-14 DAP embryos were extracted in the standard fashion and placed in 100 mm×25 mm Petri dishes saturated with 3 ml of MS+3% Sucrose. The dishes were placed into a lighted Percival (400 umol) funning at 83F and with a 16 hr. day until transplanted into flats. On March 3, ten embryo derived seedlings of the surviving genotype were transplanted into the dirt floor greenhouse.

The other half of the ear that was left on the plant to mature as described above with first set. At 28 days post pollination, the ear was harvested and placed into a growth chamber to be dried down (see dry down table) as before. After the drying period, 20 kennels from that ear were planted next to its embryo-derived seedling in the soil dirt greenhouse floor on March 3.

The plants seed and embryos derived plants were watched very carefully to see when there tassels started to shed.

RACE FOR TID
Planted September 3th

| Genotype | Date of Pollination | Extracted | Days After Pollination extracted | Date To Be Dried | Date Done Drying | Treated and Planted | # Embryos Planted | Survived | # Kernels Planted | Survived |
|---|---|---|---|---|---|---|---|---|---|---|
| NP2372 | 4-Nov | 18-Nov | 14 | Dec 4th | Dec 9th | Dec 9th | 10 | 9 | 20 | 18 |
| NP2582 | 5-Nov | 18-Nov | 13 | Dec 4th | Dec 9th | Dec 9th | 10 | 10 | 20 | 18 |
| NPAA2359 | 5-Nov | 18-Nov | 13 | Dec 4th | Dec 9th | Dec 9th | 10 | 10 | 20 | 2 |
| NP2482 | 6-Nov | 18-Nov | 12 | Dec 4th | Dec 9th | Dec 9th | 10 | 10 | 20 | 16 |
| NP2222 | 5-Nov | 18-Nov | 13 | Dec 4th | Dec 9th | Dec 9th | 10 | 8 | 20 | 16 |

All Embryos 11 DAP Biologically

| | |
|---|---|
| NP2414 | NO NICK |
| NP2643 | Never made it to tassel or to maturity |
| NP2529 | NO NICK |
| NP2377 | NO NICK |
| NP2460 | Male Sterile |

| Genotypes | Embryo Tassel Date | Days from planting to Anthesis Embryo | Seed Tassel Date | Days from planting to Anthesis Seed | Average days saved by ER | Genotype | D.O.P | # of Kernels (+/−20) |
|---|---|---|---|---|---|---|---|---|
| NP2372 | 1/20 = 1 | 42 | 2/6 = 1 | 59 | | 2482 | 26-Jan | 320 |
| | 1/21 = 2 | 43 | 2/8 = 6 | 61 | | (Embryos) | 2-Feb | 70 |
| | 1/22 = 1 | 44 | 2/9 = 1 | 62 | | | 6-Feb | 117 |
| | 1/23 = 2 | 45 | 2/10 = 2 | 63 | | | 25-Jan | 116 |
| | 1/30 = 1 | 52 | 2/12 = 2 | 65 | | | 29-Jan | 71 |
| | 2/1 = 1 | 54 | 2/13 = 1 | 66 | | | 27-Jan | 123 |
| | | | 2/14 = 1 | 67 | | | 28-Jan | 323 |
| | | | | | | | | Average 162.85 |
| | Did not make it to tassel = 1 | | Did not make it to tassel = 4 | | | | | |
| | | | | | | 2582 (Embryos) | 30-Jan | 345 |
| | Average days to Anthesis = 46 | | Average days to anthesis = 62.57 Days | | 16.57 days | | 2-Feb | 234 |
| NP2582 | 1/23 = 1 | 45 | 2/10 = 1 | 63 | | | 28-Jan | 88 |
| | 1/24 = 2 | 46 | 2/12 = 3 | 65 | | | 28-Jan | 374 |
| | 1/25 = 3 | 47 | 2/13 = 1 | 66 | | | 29-Jan | 342 |
| | 1/26 = 2 | 48 | 2/14 = 1 | 67 | | | 27-Jan | 262 |

RACE FOR TID
Planted September 3th

|  |  |  |  |  |  |  |  |
|---|---|---|---|---|---|---|---|
|  | 1/27 = 1 | 49 | 2/16 = 2 | 69 |  | 31-Jan | 276 |
|  | 1/28 = 1 | 50 | 2/17 = 1 | 70 |  | 30-Jan | 197 |
|  |  |  | 2/19 = 1 | 72 |  |  |  |
|  |  |  |  |  |  |  | Average 264.75 |
|  |  |  | Did not make it to tassel = 8 |  |  |  |  |
|  |  |  |  |  |  | 2372 (Embryos) 3-Feb | 105 |
|  |  | Average days to Anthesis = 47.3 |  | Average days to anthesis = 67.1 Days | 19.8 days | 25-Jan | 157 |
| NPAA2359 | 1/24 = 3 | 46 | 2/16 = 1 | 69 |  | 22-Jan | 225 |
|  | 1/25 = 3 | 47 | 2/19 = 1 | 72 |  | 24-Jan | 211 |
|  | 1/27 = 1 | 49 |  |  |  | 24-Jan | 162 |
|  | 1/28 = 1 | 50 |  |  |  | 23-Jan | 178 |
|  | 1/29 = 1 | 51 |  |  |  | 24-Jan | 238 |
|  |  |  |  |  |  |  | Average 182.29 |
|  | Did not make it to tassel = 1 |  |  |  |  |  |  |
|  |  | Average days to Anthesis = 47.6 |  | Average days to anthesis = 70.5 Days | 22.9 days | 26-Jan | 102 |
|  |  |  |  |  |  | 2359 (Embryos) 31-Jan | 228 |
| NP2482 | 1/24 = 3 | 46 | 2/8 = 2 | 61 |  | 26-Jan | 118 |
|  | 1/26 = 1 | 48 | 2/9 = 1 | 62 |  | 29-Jan | 209 |
|  | 1/27 = 1 | 49 | 2/10 = 2 | 63 |  | 25-Jan | 204 |
|  | 1/28 = 1 | 50 | 2/12 = 3 | 65 |  | 26-Jan | 202 |
|  | 1/30 = 2 | 52 | 2/14 = 2 | 67 |  | 25-Jan | 153 |
|  | 2/5 = 1 | 58 | 2/16 = 2 | 69 |  |  | Average 173.71 |
|  | Did not make it to tassel = 1 |  | Did not make it to tassel = 4 |  |  | 29-Jan | 48 |
|  |  | Average days to Anthesis = 49.67 |  | Average days to anthesis = 64.75 Days | 15.08 days | 31-Jan | 219 |
|  |  |  |  |  |  | 2222 (Embryos) 30-Jan | 205 |
|  |  |  |  |  |  |  | Average 157.33 |
| NP2222 | 1/27 = 1 | 49 | 2/12 = 2 | 65 |  |  |  |
|  | 1/28 = 2 | 50 | 2/13 = 2 | 66 |  |  |  |
|  | 1/29 = 1 | 51 | 2/14 = 2 | 67 |  |  |  |
|  | 1/30 = 1 | 52 | 2/15 = 2 | 68 |  |  |  |
|  | 2/1 = 1 | 54 | 2/16 = 2 | 69 |  |  |  |
|  | 2/2 = 1 | 55 | 2/17 = 1 | 70 |  |  |  |
|  |  |  | 2/19 = 1 | 72 |  |  |  |
|  | Did not make it to tassel = 1 |  | Did not make it to tassel = 4 |  |  |  |  |
|  |  | Average days to Anthesis = 51.57 |  | Average days to anthesis = 67.67 | 16.1 days |  |  |

New Race
December 4th Planted

| Genotype | Date of Pollination | Extracted | Days After Pollination extracted | Date To Be Dried | Date Done Drying | Treated and Planted | # Embryos Planted | Survived | # Kernels Planted | Survived |
|---|---|---|---|---|---|---|---|---|---|---|
| NP2529 | 30-Jan | 13-Feb | 14 | 1-Mar | 5-Mar | 5-Mar | 10-Jan | 10-Jan | 20-Jan |  |
|  |  |  | Biologically 11-12 Day old embryos |  |  |  |  |  |  |  |

| Genotypes | Embryo Tassel Date | Days from planting to Anthesis Embryo | Seed Tassel Date | Days from planting to Anthesis Seed | Average days saved by ER so far |
|---|---|---|---|---|---|
| NP2529 | 4/19 = 2 | 48 | 4/25 = 1 | 54 |  |
|  | 4/21 = 3 | 50 | 4/27 = 3 | 56 |  |
|  | 4/24 = 1 | 53 | 4/28 = 3 | 57 |  |
|  | 4/27 = 2 | 56 | 4/29 = 5 | 58 |  |

| New Race December 4th Planted | | | | |
|---|---|---|---|---|
| 4/28 = 1 Did not make it to tassel = 1 | 57 Average days to Anthesis = 52.00 | 5/2 = 1 Did not make it to tassel = 7 | 61 Average days to anthesis = 57.23 | 5.23 days |
| Split the diff. use 28 DAP. | | | | |
| 85 F. Day 1 88 F. Day 2 90 F. Day 3 92 F. day 4 95 F. day 5 | | 57% Humidity | | |

ABA = abscissic acid

Results:
In general, the embryo derived plants were smaller than their fast-track seed derived counterparts. None the less, seed production from the plants was very good.

| | DURATION (days) TO ANTHESIS | | |
|---|---|---|---|
| INBRED | EMBRYO RESCUE* Avg. Anthesis Date/Seed Production | FAST-TRACK SEED: Avg. Anthesis Date | EMBRYO RESCUE: TIME SAVINGS |
| NP2372 (DD5908) Poll. Date Nov. 4, 2008 | Jan. 21, 2009 182 seed/ear, n = 7 | 2/9/ | 19 days |
| NP2582 (LL7621) Poll. Date Nov. 5, 2008 | Jan. 25, 2009 264 seed/ear, n = 8 | 2/14 | 20 days |
| NPAA2359 (AA2359) Poll. Date Nov. 5, 2008 | Jan. 27, 2009 173 seed/ear, n = 7 | 2/17 Did not like early harvest. Only 2 plants survived and were slow growing | 21 days |
| NP2482 (AF3050) Poll. Poll. Date Nov. 6, 2008 | Jan. 28, 2009 162 seed/ear, n-7 | 2/11 | 14 days |
| NP2222 (AX5707) Poll. Poll. Date Date Nov. 5, 2008 | Jan. 30, 2009 157 seed/ear, n = 3 | 2/18 | 19 days |
| NP2529 Pollination Date Jan. 30, 2008 | Apr. 23, 2009, n = 9 No seed was generated, because it was obvious that seed production was possible. | Apr. 28, 2009 | 5 days |

Regarding the duration period to anthesis, these data indicate that under the conditions employed in this experiment, the embryo rescue method may result in a time savings in plants from pollination to those same plants reaching anthesis. These observations suggest that over the course of the introgression process, we gain an additional generation per year in some corn lines. Thus by combining the ease and utility of the power wash method of embryo extraction and the observation of reduced generational time to anthesis, a methodology provides a means to facilitate large-scale transgene introgression programs. Coupling these observations with our observations regarding in vitro selection on immature embryos, forms the improved method for transgenic trait introgression.

What is claimed is:

1. A method of embryo rescue for selecting transgenic trait introgression from two or more transgenes, the steps of the method comprising:
    displacing embryos with a fluid stream from seeds, wherein said seeds were harvested between 8 to 20 days after pollination of a transformed plant,
    growing the displaced embryos in a medium with at least two agents which select for transgenes, and
    growing plants from rescued embryos, which embryos were not subjected to transformation, and having at least two transgenes introgressed.

2. The method according to claim 1 wherein the medium comprises glyphosate, glufosinate, and mannose.

3. The method according to claim 1 wherein an embryo without transgenes will not survive in the media.

4. The method according to claim 1 further comprising breeding with plants from rescued embryos comprising at least one of the following: a glyphosate resistant gene, a PMI gene, a Pat gene or Bar gene.

5. A method of selecting breeding material comprising the steps of
    harvesting ears within at least one of 8, 9, 10, 11, 12, 13, 14, 15, 16, 17, 18, 19 or 20 days after pollination,
    extracting embryos from seed on said ears with an embryo extraction apparatus using a fluid stream,
    germinating the displaced embryos,
    growing seedlings from said displaced embryos wherein said embryos were not transformed, and
    selecting a plant as breeding material.

6. The method of claim 5, wherein growing seedlings includes the use of a selection medium within 20 days after pollination.

7. The method of claim 5 wherein the method further comprises breeding, and wherein from date of pollination to plants reaching anthesis, time to breeding is shortened by one to three weeks relative to a seed that is germinated into a seedling without having its embryo removed.

8. The method of claim 5 comprising the step of testing seedlings for genetic segregation or transgenes.

9. The method of claim 5 wherein the extracted embryo is haploid, and said embryo is placed in contact with a mitotic arrest agent, medium and/or plant hormones.

10. The method of claim 9 wherein said medium and/or plant hormones facilitate germination, growth and development of seedlings.

* * * * *